(12) United States Patent
Jiang et al.

(10) Patent No.: US 12,307,150 B2
(45) Date of Patent: May 20, 2025

(54) DEVICE CONTROL METHOD AND APPARATUS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Yi Jiang, Guangdong (CN); Biao Ma, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 264 days.

(21) Appl. No.: 18/148,522

(22) Filed: Dec. 30, 2022

(65) Prior Publication Data

US 2023/0185506 A1    Jun. 15, 2023

Related U.S. Application Data

(63) Continuation of application No. PCT/CN2021/098984, filed on Jun. 8, 2021.

(30) Foreign Application Priority Data

Jul. 27, 2020  (CN) .......................... 202010732398.3
Nov. 26, 2020  (CN) .......................... 202011350436.5

(51) Int. Cl.
*G06F 1/16*        (2006.01)
*G06F 3/04817*     (2022.01)
(Continued)

(52) U.S. Cl.
CPC .............. *G06F 3/14* (2013.01); *G06F 1/1652* (2013.01); *G06F 3/04817* (2013.01); *G06F 3/0482* (2013.01); *G09F 9/301* (2013.01)

(58) Field of Classification Search
None
See application file for complete search history.

(56) References Cited

U.S. PATENT DOCUMENTS

2014/0223343 A1* 8/2014 Lee ...................... G06F 3/04817
                                                  715/765
2017/0154609 A1* 6/2017 Yoon ....................... G09G 5/373
(Continued)

FOREIGN PATENT DOCUMENTS

CN     104077129     10/2014
CN     105404447      3/2016
(Continued)

OTHER PUBLICATIONS

CNIPA, Second Office Action for CN Application No. 202011350436.5, Jul. 6, 2024.
(Continued)

*Primary Examiner* — Christopher J Fibbi
(74) *Attorney, Agent, or Firm* — Hodgson Russ LLP

(57) ABSTRACT

The method includes: obtaining a changing distance of the retractable display screen in an extending-retracting direction in response to the retractable display screen being extended or retracted; and adjusting a spacing of application icons displayed on a current desktop in the extending-retracting direction according to the changing distance, and/or adjusting a number of the application icons displayed on the current desktop in the extending-retracting direction according to the changing distance.

14 Claims, 12 Drawing Sheets

(51) Int. Cl.
*G06F 3/0482* (2013.01)
*G06F 3/14* (2006.01)
*G09F 9/30* (2006.01)

(56) References Cited

U.S. PATENT DOCUMENTS

| | | | |
|---|---|---|---|
| 2018/0081398 A1* | 3/2018 | Shin | G06F 1/1641 |
| 2019/0261519 A1 | 8/2019 | Park et al. | |
| 2019/0279594 A1* | 9/2019 | Zhang | G09G 3/035 |
| 2019/0384438 A1* | 12/2019 | Park | G06F 3/0485 |
| 2020/0348822 A1* | 11/2020 | Dascola | G06F 3/04817 |
| 2022/0291811 A1* | 9/2022 | Zhang | G06F 1/1641 |

FOREIGN PATENT DOCUMENTS

| | | |
|---|---|---|
| CN | 106155503 | 11/2016 |
| CN | 106484174 | 3/2017 |
| CN | 107704185 | 2/2018 |
| CN | 107995971 | 5/2018 |
| CN | 109788097 | 5/2019 |
| CN | 109981839 | 7/2019 |
| CN | 110007882 | 7/2019 |
| CN | 110377115 | 10/2019 |
| CN | 110471588 | 11/2019 |
| CN | 210270658 | 4/2020 |
| CN | 111159983 | 5/2020 |
| EP | 3531230 | 8/2019 |
| WO | 2019240519 | 12/2019 |

OTHER PUBLICATIONS

WIPO, International Search Report and Written Opinion for PCT/CN2021/098984, Sep. 9, 2021.
EPO, Extended European Search Report for EP Application No. 21849689.1, Dec. 11, 2023.
CNIPA, First Office Action for CN Application No. 202011350436.5, Mar. 30, 2024.

* cited by examiner

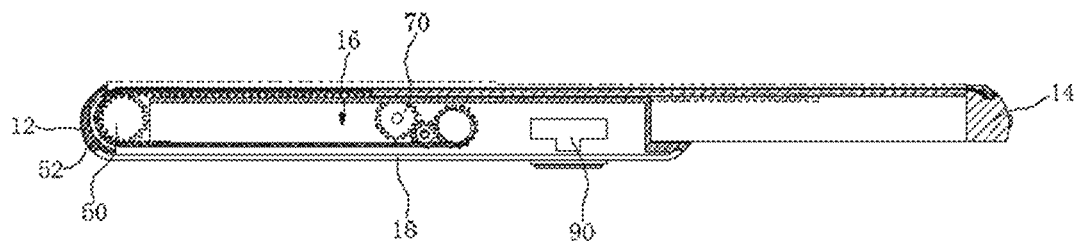
FIG. 5
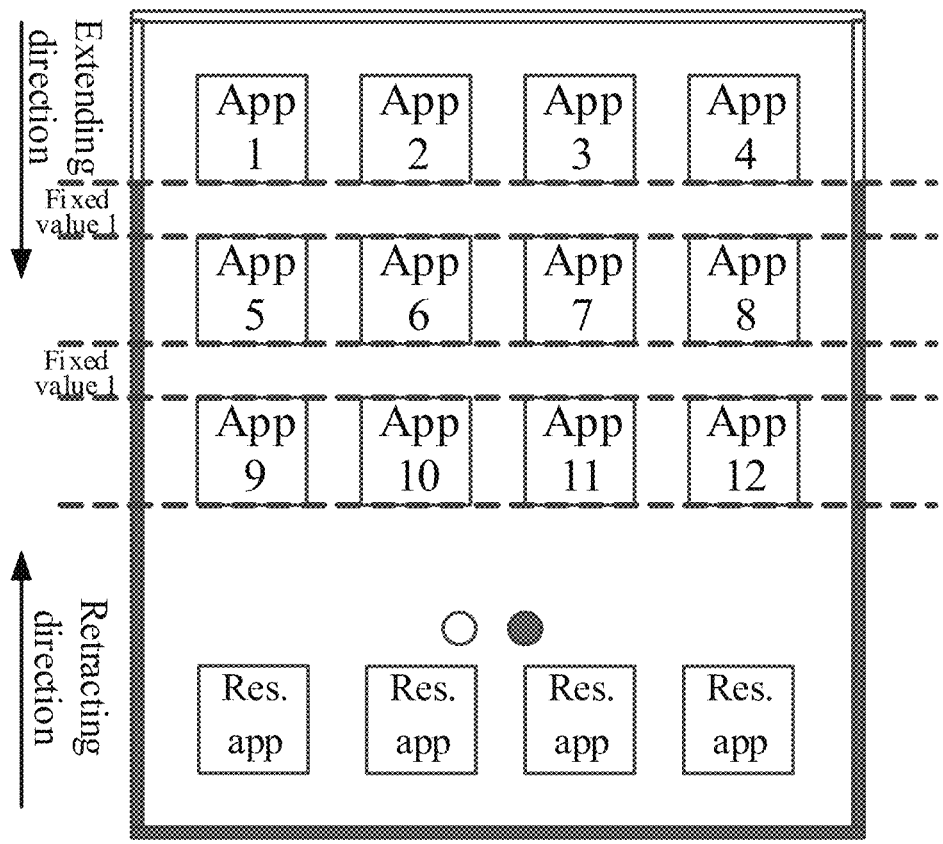
FIG. 6
FIG. 7

| obtaining a changing distance of the retractable display screen in an extending-retracting direction in response to the retractable display screen being extended or retracted | ⟵ 201 |

↓

| increasing a spacing of application icons on a current desktop in the extending-retracting direction in response to the changing distance being an extending distance | ⟵ 202 |

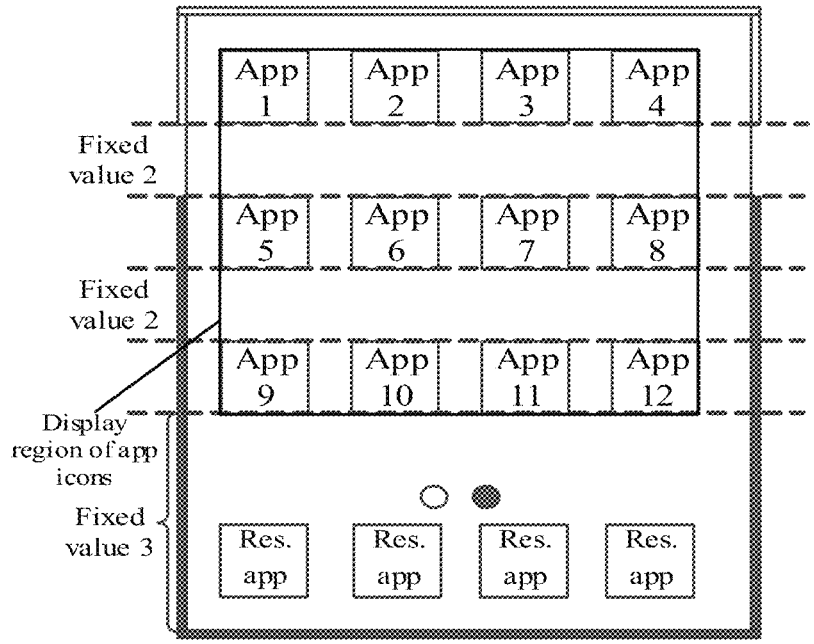

FIG. 10

| obtaining a changing distance of the retractable display screen in an extending-retracting direction in response to the retractable display screen being extended or retracted | ← 301 |

↓

| increasing a spacing of application icons on a current desktop in the extending-retracting direction in response to the changing distance being an extending distance | ← 302 |

↓

| stopping increasing the spacing of the application icons in the extending-retracting direction in response to the spacing of the application icons in the extending-retracting direction being equal to a first spacing | ← 303 |

↓

| after an initial moment at which the spacing of the application icons in the extending-retracting direction is equal to the first spacing, increasing a number of the application icons displayed on the current desktop in response to a newly added extending distance being greater than a first distance | ← 304 |

FIG. 11

DEVICE CONTROL METHOD AND APPARATUS, STORAGE MEDIUM, AND ELECTRONIC DEVICE

CROSS-REFERENCE TO RELATED APPLICATIONS

The present application is a continuation of International Patent Application No. PCT/CN2021/098984, filed on Jun. 8, 2021, which claims priority to Chinese Patent Application No. 202010732398.3, filed on Jul. 27, 2020, and Chinese Patent Application No. 202011350436.5, filed on Nov. 26, 2020. The entire disclosures of the above-identified applications are incorporated by reference herein.

TECHNICAL FIELD

The present disclosure relates to the field of communication technologies, and in particular to a device control method, an apparatus, a storage medium, and an electronic device.

BACKGROUND

With the development of technology, there are more and more applications installed in electronic devices, such as video applications, game applications, and instant messaging applications. After these applications are installed on the electronic device, they generate shortcuts on the display interface of the electronic device, for example, in the form of application icons on the desktop of the electronic device.

SUMMARY OF THE DISCLOSURE

The present disclosure provides a method, a computer-readable storage medium, and an electronic device.

In a first aspect, the present disclosure provides a device control method, performed by an electronic device; wherein the electronic device includes a retractable display screen, and the device control method includes: obtaining a changing distance of the retractable display screen in an extending-retracting direction in response to the retractable display screen being extended or retracted; and adjusting a spacing of application icons displayed on a current desktop in the extending-retracting direction according to the changing distance, and/or adjusting a number of the application icons displayed on the current desktop in the extending-retracting direction according to the changing distance.

In a second aspect, the present disclosure provides a non-transitory computer-readable storage medium, storing a computer program; wherein the computer program is executable by a computer to cause the computer to perform the device control method in any of embodiments of the present disclosure.

In a third aspect, the present disclosure provides an electronic device, including a processor and a memory; wherein the memory stores a computer program, and the processor is configured to perform the device control method in any of embodiments of the present disclosure.

BRIEF DESCRIPTION OF THE DRAWINGS

In order to illustrate the technical solutions in the embodiments of the present disclosure more clearly, the following briefly introduces the drawings that are used in the description of the embodiments. Obviously, the drawings in the following description are only some embodiments of the present disclosure. For those skilled in the art, other drawings can also be obtained from these drawings without creative effort.

FIG. 5 is further another structural schematic view of an electronic device arranged with a retractable display screen according to an embodiment of the present disclosure.

FIG. 6 is a flowchart of a device control method according to an embodiment of the present disclosure.

FIG. 7 is a structural schematic view of an electronic device arranged with a retractable display screen in a retracted state according to an embodiment of the present disclosure.

FIG. 10 is a schematic view of a corresponding change in a spacing of application icons on a current desktop in a extending-retracting direction as a changing distance of a retractable display screen changes according to an embodiment of the present disclosure.

FIG. 11 is a flowchart of a device control method according to further another embodiment of the present disclosure.

DETAILED DESCRIPTION

Figure 1:
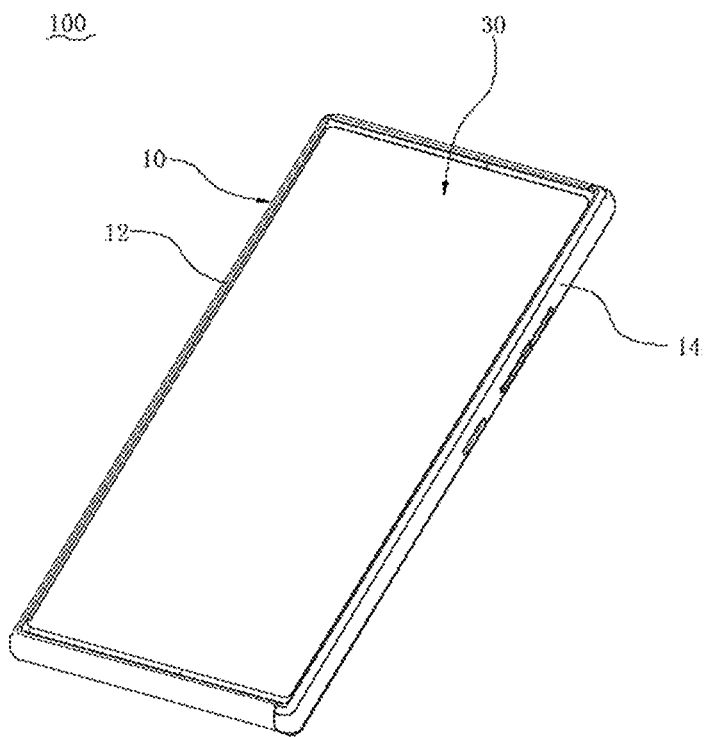
FIG. 1 is a structural schematic view of an electronic device arranged with a retractable display screen according to an embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative efforts shall fall within the scope of the present disclosure.

Reference herein to an "embodiment" means that a particular feature, structure, or characteristic described in connection with the embodiment can be included in at least one embodiment of the present disclosure. The appearances of the phrase in various places in the specification are not necessarily all referring to the same embodiment, nor a separate or alternative embodiment that is mutually exclusive of other embodiments. It is explicitly and implicitly understood by those skilled in the art that the embodiments described herein may be combined with other embodiments.

Embodiments of the present disclosure provide a device control method, applied to an electronic device; wherein the electronic device includes a retractable display screen, and the device control method includes:

obtaining a changing distance of the retractable display screen in an extending-retracting direction in response to the retractable display screen being extended or retracted; and adjusting a spacing of application icons displayed on a current desktop in the extending-retracting direction according to the changing distance, and/or adjusting a number of the application icons displayed on the current desktop in the extending-retracting direction according to the changing distance.

In some embodiments, the adjusting a spacing of application icons displayed on a current desktop in the extending-retracting direction according to the changing distance includes:

increasing the spacing of the application icons displayed on the current desktop in the extending-retracting direction in response to the changing distance being an extending distance.

In some embodiments, the increasing the spacing of the application icons displayed on the current desktop in the extending-retracting direction includes:

increasing the spacing of the application icons in the extending-retracting direction until the retractable display screen is stopped extending.

In some embodiments, the increase the spacing of the application icons in the extending-retracting direction until the retractable display screen is stopped extending includes:

synchronously increasing the spacing of the application icons in the extending-retracting direction as the extending distance increases, until the retractable display screen is stopped extending.

In some embodiments, the adjusting a number of the application icons displayed on the current desktop in the extending-retracting direction according to the changing distance includes:

continuing to increase the spacing of the application icons in the extending-retracting direction in response to the spacing of the application icons in the extending-retracting direction being less than a first spacing; wherein the first spacing is greater than the spacing of the application icons in the extending-retracting direction when the retractable display screen is in an unextended state.

In some embodiments, the adjusting a number of the application icons displayed on the current desktop in the extending-retracting direction according to the changing distance further includes:

stopping increasing the spacing of the application icons in the extending-retracting direction in response to the spacing of the application icons in the extending-retracting direction being equal to the first spacing.

In some embodiments, after the stopping increasing the spacing of the application icons in the extending-retracting direction in response to the spacing of the application icons in the extending-retracting direction being equal to the first spacing, the method may further include:

after an initial moment at which the spacing of the application icons in the extending-retracting direction is equal to the first spacing, increasing the number of the application icons displayed on the current desktop in response to a newly added extending distance being greater than a first distance.

In some embodiments, the first distance is a sum of a length of each application icon in the extending-retracting direction and the first spacing.

In some embodiments, the first distance is equal to the first spacing.

In some embodiments, the spacing of the application icons in the extending direction is set with a first initial spacing, and the first initial spacing is the spacing of the application icons in the extending-retracting direction when the retractable display screen is in an unextended state; the adjusting a number of the application icons displayed on the current desktop in the extending-retracting direction according to the changing distance includes:

maintaining the spacing of the application icons in the extending-retracting direction as the first initial spacing and increasing the number of the application icons displayed on the current desktop, in response to the changing distance being the extending distance.

In some embodiments, the increasing the number of the application icons displayed on the current desktop includes:

increasing the number of the application icons displayed on the current desktop, in response to the extending distance being greater than a second distance.

In some embodiments, the second distance is a sum of a length of each application icon in the extending-retracting direction and the first initial spacing.

In some embodiments, the second distance is equal to the first initial spacing.

In some embodiments, an added application icon on the current desktop is derived from another desktop.

In some embodiments, the adjusting a spacing of application icons displayed on a current desktop in the extending-retracting direction according to the changing distance includes:

reducing the spacing of the application icons displayed on the current desktop in the extending-retracting direction, in response to the changing distance being a retracting distance.

In some embodiments, the reducing the spacing of the application icons displayed on the current desktop in the extending-retracting direction includes:

reducing the spacing of the application icons in the extending-retracting direction until the extendable display screen is stopped retracting.

In some embodiments, the reducing the spacing of the application icons in the extending-retracting direction until the extendable display screen is stopped retracting includes:

synchronously reducing the spacing of the application icons in the extending-retracting direction as the retracting distance decreases, until the retractable display screen is stopped retracting.

In some embodiments, the reducing the spacing of the application icons displayed on the current desktop in the extending-retracting direction includes:

obtaining a first extending length of the retractable display screen at an initial moment when the spacing of the application icons in the extending-retracting direction increases to be equal to a second spacing;

maintaining the spacing of the application icons in the extending-retracting direction unchanged, in response to an extending length of the retractable display screen being greater than or equal to the first extending length; and reducing the spacing of the application icons in the extending-retracting direction, in response to the extending length of the retractable display screen being less than the first extending length.

In some embodiments, after the maintaining the spacing of the application icons in the extending-retracting direction unchanged, in response to an extending length of the retractable display screen being greater than or equal to the first extending length, further including:

reducing the number of the application icons displayed on the current desktop in response to the retracting distance being greater than a third distance.

In some embodiments, the third distance is a sum of a length of each application icon in the extending-retracting direction and the second spacing.

In some embodiments, the third distance is equal to the second spacing.

In some embodiments, the adjusting a number of the application icons displayed on the current desktop in the extending-retracting direction according to the changing distance includes:

maintaining the spacing of the application icons in the extending-retracting direction at a second initial spacing and reducing the number of the application icons displayed on the current desktop, in response to the changing distance being a retracting distance; wherein the second initial spacing is a spacing of the application icons in the extending-retracting direction before a current extension or retraction.

In some embodiments, the reducing the number of the application icons displayed on the current desktop includes:

reducing the number of the application icons displayed on the current desktop in response to the retracting distance being greater than a fourth distance.

In some embodiments, the fourth distance is a sum of a length of each application icon in the extending-retracting direction and the second initial spacing.

In some embodiments, the fourth distance is equal to the second initial spacing.

Referring to the drawings, where same component symbols represent same components, and the principles of the present disclosure are exemplified by being implemented in a suitable computing environment. The following description is based on illustrated specific embodiments of the present disclosure and should not be construed as limiting other specific embodiments of the present disclosure not detailed herein.

Figure 2:
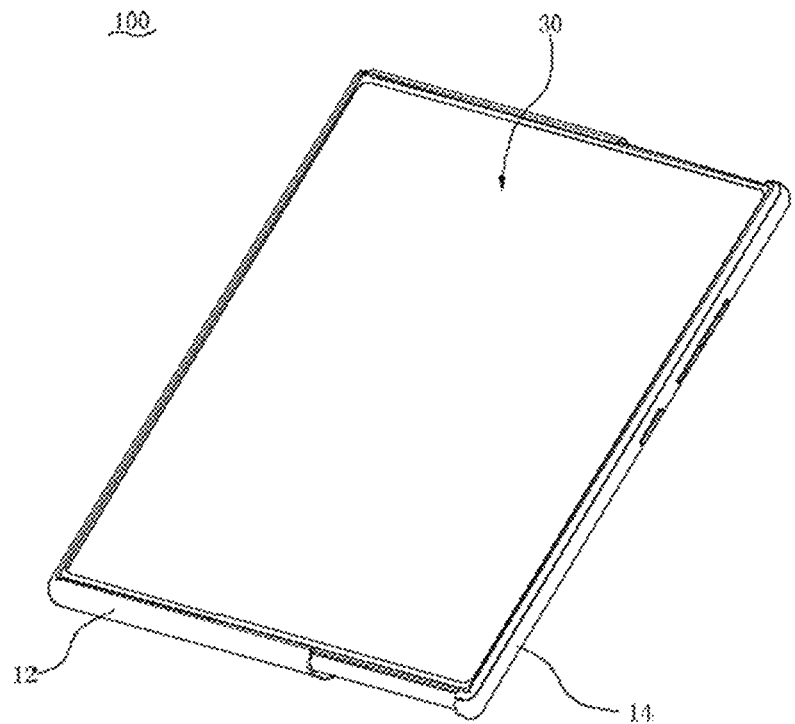
FIG. 2 is another structural schematic view of an electronic device arranged with a retractable display screen according to an embodiment of the present disclosure.
Figure 3:
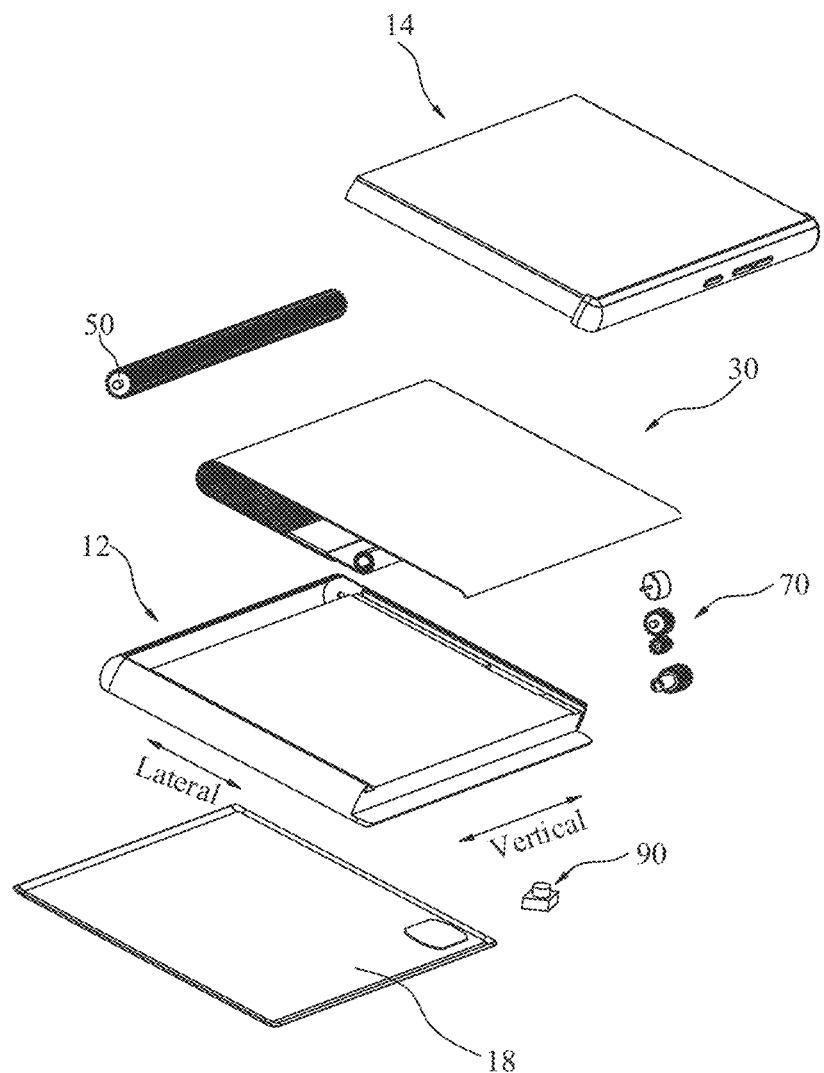
FIG. 3 is further another structural schematic view of an electronic device arranged with a retractable display screen according to an embodiment of the present disclosure.

Referring to FIG. 1 to FIG. 3, FIG. 1 to FIG. 3 are schematic structural views of an electronic device arranged with a retractable touch display screen according to embodiments of the present disclosure.

The electronic device 100 includes a housing assembly 10, a flexible display screen 30, a driving member 50, and a driving mechanism 70. The housing assembly 10 is a hollow structure. Components such as the driving member 50, the driving mechanism 70, and a camera 90 may all be arranged in the housing assembly 10. It can be understood that the electronic device 100 in the embodiments of the present disclosure includes, but is not limited to, mobile terminals such as mobile phones and tablet computers, or other portable electronic devices. In this specification, the electronic device 100 is a mobile phone as an example for description.

In some embodiments, the housing assembly 10 includes a first housing 12 and a second housing 14, and the first housing 12 and the second housing 14 are capable of relative movement. In the embodiments, the first housing 12 and the second housing 14 are slidably connected, that is, the second housing 14 can slide relative to the first housing 12.

Figure 4:
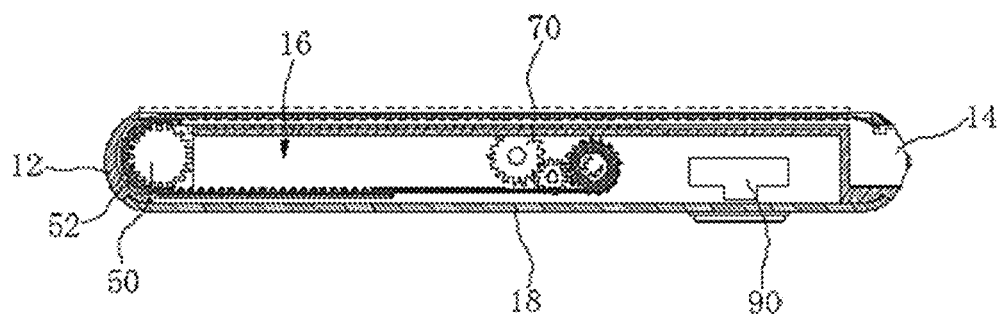
FIG. 4 is further another structural schematic view of an electronic device arranged with a retractable display screen according to an embodiment of the present disclosure.

Referring to FIG. 4 and FIG. 5, the first housing 12 and the second housing 14 together define an accommodating space 16. The accommodating space 16 may be configured to accommodate components such as the driving member 50, the camera 90, and the driving mechanism 70. The housing assembly 10 may further include a rear cover 18, and the rear cover 18, the first housing 12, and the second housing 14 together define the accommodating space 16.

The driving member 50 is arranged on the second housing 14. An end of the flexible display screen 30 is arranged on the first housing 12, the flexible display screen 30 bypasses the driving member 50, and another end of the flexible display screen is arranged in the accommodating space 16, such that a part of the flexible display screen may be hidden in the accommodating space 16. The part of the flexible display screen 30 hidden in the accommodating space 16 may not be lit. When the first housing 12 and the second housing 14 moved relatively away from each other, the flexible display screen 30 may be driven to extend by the driving member 50, such that more of the flexible display screen 30 is exposed outside the accommodating space 16, as shown in FIG. 5. The flexible display screen 30 exposed outside the accommodating space 16 is lit, such that a display region presented by the electronic device 100 becomes larger. For example, FIG. 1 to FIG. 2 may be a comparison of the morphological changes of the flexible display screen 30 of the electronic device from a retracted state to a laterally extended state.

The driving member 50 may be a rotating shaft structure, an outside of which is arranged with teeth 52. The flexible display screen 30 is coupled to the driving member 50 by engaging, etc., and a part of the flexible display screen 30 engaged on the driving member 50 is moved and extended by the driving member 50 when the first housing 12 and the second housing 14 are moved relatively away from each other.

It can be understood that the driving member 50 may be a circular shaft without the teeth 52. When the first housing 12 and the second housing 14 moved relatively away from each other, a part of the flexible display screen 30 wound on the driving member 50 is extended by the driving member 50 such that more of the flexible display is exposed outside the accommodating space 16 and is in the laterally extended state. Specifically, the driving member 50 is rotatably arranged on the second housing 14, and the driving member 50 can rotate with the movement of the flexible display screen 30 as the flexible display screen 30 is gradually extended.

In other embodiments, the driving member 50 may be fixed on the second housing 14, and the driving member 50 has a smooth surface. When the flexible display screen 30 is extended, the driving member 50 is in slidable contact with the flexible display screen 30 through its smooth surface.

When the first housing 12 and the second housing 14 are moved relatively close to each other, the flexible display screen may be driven and retracted by the driving member 50. Alternatively, the electronic device 100 may further include a reset member (not shown). The end of the flexible display screen accommodated in the accommodating space 16 is coupled to the reset member. When the first housing 12 and the second housing 14 re moved relatively close to each other, the reset member drives the flexible display screen 30 to be reset, such that a part of the flexible display screen is retracted into the accommodating space 16.

In some embodiments, the driving mechanism 70 may be arranged in the accommodating space 16, and the driving mechanism 70 may be coupled to the second housing 14. The driving mechanism 70 is configured to drive the second housing 14 to move relatively away from the first housing 12, thereby driving the flexible display screen assembly 30 to extend. It can be understood that, the driving mechanism 70 may be omitted, and the user can directly move the first housing and the second housing relative to each other by manual means.

It should be noted that, in addition to enabling the flexible display screen to extend and retract in the lateral direction of the electronic device (for example, in the left-right direction) according to the hardware arrangement design in FIG. 1 to FIG. 5, in other embodiments, it is also possible to change the direction of the hardware arrangement design, such that the flexible display screen can extend and retract in the longitudinal direction of the electronic device (for example, in the up-down direction).

Referring to FIG. 6, FIG. 6 is a flowchart of a device control method according to an embodiment of the present disclosure. The device control method may be applied to an electronic device, and the electronic device may include a retractable display screen. The flow of the device control method may include operations at blocks illustrated herein.

At block 101: obtaining a changing distance of the retractable display screen in an extending-retracting direction in response to the retractable display screen being extended or retracted.

With the continuous development of technology, the form of electronic device is also changing, from a small screen to a large screen, from a simple display screen for displaying images and text to a touch display screen that can receive user touch operations, and so on. With the development of technology, users have higher and higher requirements for the intelligence of electronic devices. However, in the related art, the degree of intelligence of the electronic devices is still not high enough.

It should be noted that, in the embodiments of the present disclosure, the electronic device may have a retractable display screen. The retractable display screen may be a retractable display panel. The retractable display screen may be a flexible display screen, and the flexible display screen may be bent, rolled, folded, etc. On an electronic device arranged with a retractable display screen, the visible size of the screen may be increased by extending the retractable display screen, and the visible size of the screen may be reduced by retracting the retractable display screen. For example, the flexible display screen 30 in FIG. 1 to FIG. 5 may be a retractable display screen.

For example, the state of an electronic device with a retractable display screen when it is not extended is called a small-screen state, and the state when it is fully extended is called a large-screen state. The display screen of the electronic device can extend from the small-screen state to the large-screen state, and can also retract from the large-screen state to the small-screen state.

The changing distance refers to a length of the retractable display screen that changes in a corresponding extending-retracting direction when the retractable display screen is retracted. For example, in the case of vertical extending-retracting direction, the changing distance of the retractable display screen in the extending-retracting direction is the distance that the retractable display screen increases or decreases in the vertical direction; in the case of lateral extending-retracting direction, the changing distance of the retractable display screen in the extending-retracting direction is the distance that the retractable display screen increases or decreases in the lateral direction.

It can be understood that, in the embodiments of the present disclosure, the retractable display screen of the electronic device may be extended or retracted manually according to the user, or the electronic device may automatically control the retractable display screen to extend or retract after the user triggers a display screen extension instruction.

At block 102: adjusting a spacing of application icons in the extending-retracting direction displayed on a current desktop and/or a number of the application icons in the extending-retracting direction according to the changing distance.

With the development of technology, more and more applications are installed in electronic devices, such as video applications, game applications, and instant messaging applications. After the applications are installed on the electronic device, corresponding shortcuts will be generated on the display page of the electronic device to facilitate the user to quickly find the entrance of the corresponding application, for example, the application icon on the desktop.

Among them, the desktop is a starting point for all application operations, and is a main screen region displayed by the operating system after the computer starts up and the operating system runs to a normal state.

Generally speaking, due to the large number of applications, it is difficult to fit all application icons that need to be displayed on one desktop page, so there will be one or more desktop pages in the electronic device. The current desktop herein refers to a currently displayed desktop page.

It should be noted that, when the electronic device extends and retracts, two situations exist: extends and retracts vertically or laterally. Taking the electronic device being a smartphone as an example, the vertical extension-and-retraction refers to a situation in which the smartphone is extended or retracted when the smartphone is in a portrait state. In this case, the spacing between the application icons in the extending direction and the distance between the application icons in the retracting direction are a row spacing of the application icons, referring to FIG. 7. The lateral extension-and-retraction refers to a situation in which the smartphone is extended or retracted when the smartphone is in a landscape state. In this case, the spacing between the application icons in the extending direction and the spacing between the application icons in the retracting direction are a column spacing of the application icons, referring to FIG. 8.

For example, when the changing distance of the retractable display screen of the electronic device is obtained, the electronic device may adjust the spacing of the application icons in the extending-retracting direction of the application icons displayed on the current desktop and/or the number of the application icons in the extending-retracting direction according to the changing distance.

When the retractable display screen is extended and retracted, the changing distance of the retractable display screen in the extending-retracting direction changes, and the area of the corresponding display region will increase or decrease. Therefore, the spacing of the application icons in the extending-retracting direction of the application icons displayed on the current desktop and/or the number of the application icons in the extending-retracting direction may be changed accordingly based on the increased area or the decreased area.

The implementation of the present disclosure is to obtain a changing distance of the retractable display screen in an extending-retracting direction in response to the retractable display screen being retracted, and adjust the spacing of the application icons in the extending-retracting direction of the application icons displayed on the current desktop and/or the number of the application icons in the extending-retracting direction. In this solution, according to the changing distance of the retractable display screen of the electronic device in the extending-retracting direction, the spacing of the application icons displayed on the current desktop in the extending-retracting direction and/or the number of the application icons in the extending-retracting direction are correspondingly adjusted, such that the layout of application icons on the display region changes accordingly with the changing distance during the extending or retracting of the retractable display screen, thereby enhancing the flexibility of the arrangement of application icons on the display region during the extending or retracting of the retractable display screen.

Figures 8, 9:
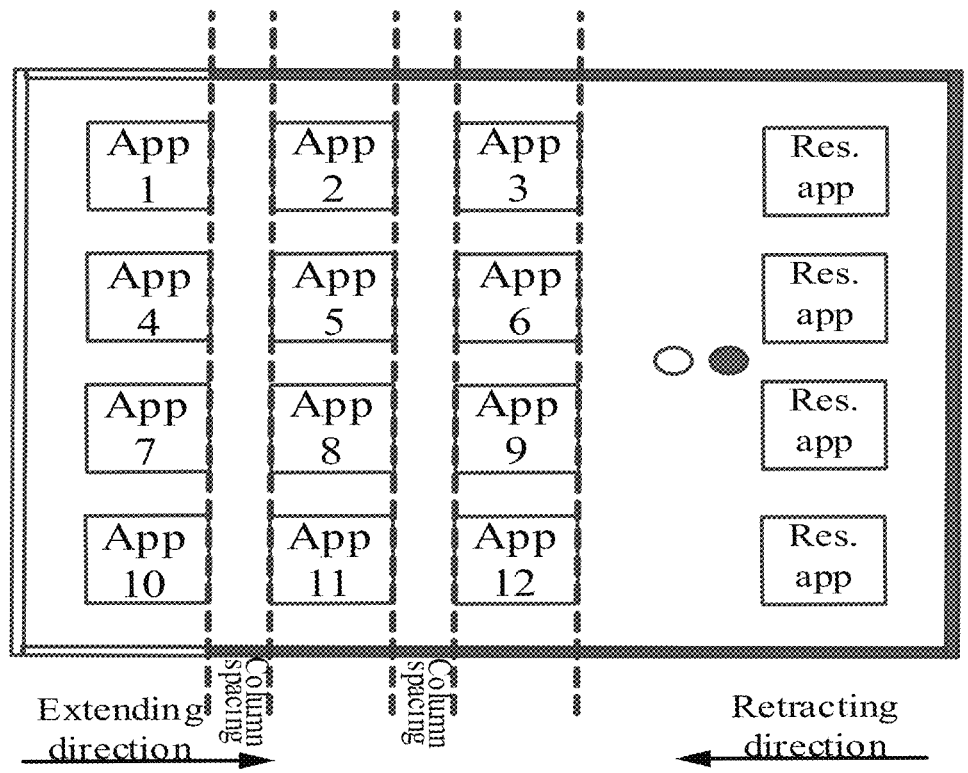
FIG. 8 is a structural schematic view of an electronic device arranged with a retractable display screen in a retracted state according to another embodiment of the present disclosure.
FIG. 9 is a flowchart of a device control method according to another embodiment of the present disclosure.

According to the method described in the previous embodiments, the following examples will be used for further detailed description. Referring to FIG. 9, FIG. 9 is a flowchart of a device control method according to another embodiment of the present disclosure. The device control method may be applied to an electronic device, and the electronic device may include a retractable display screen. The flow of the device control method may include operations at blocks illustrated herein.

At block 201: obtaining a changing distance of the retractable display screen in an extending-retracting direction in response to the retractable display screen being extended or retracted.

When the electronic device extends and retracts, two situations exist: extends and retracts vertically or laterally. Taking the electronic device being a smartphone as an example, the vertical extension-and-retraction refers to a situation in which the smartphone is extended or retracted when the smartphone is in a portrait state. In this case, the spacing between the application icons in the extending-retracting direction is a row spacing of the application icons, referring to FIG. 7. The lateral extension-and-retraction refers to a situation in which the smartphone is extended or retracted when the smartphone is in a landscape state. In this case, the spacing between the application icons in the extending-retracting direction is a column spacing of the application icons, referring to FIG. 8.

In some embodiments, the changing distance may be obtained by a distance increased in the extending-retracting direction of the display region after the current extension-and-retraction relative to the display region without the current extension-and-retraction.

It can be understood that when the retractable display screen is extended, the changing distance is an extending distance.

It should be noted that, since the vertical extension-and-retraction and lateral extension-and-retraction are only different in direction, and the display mode of the adjusted application icons on the desktop is the same, the embodiments use the vertical extension-and-retraction as an example.

At block 202: increasing a spacing of application icons on a current desktop in the extending-retracting direction in response to the changing distance being an extending distance.

Since the embodiments discuss the case of vertical extension-and-retraction, the spacing of the application icons in the extending-retracting direction herein is a row spacing.

For example, referring to FIG. 7, the electronic device is in an unextended state, that is, a small-screen state. Assuming that in the small-screen state, in addition to the application icons of resident applications, a maximum of 3 rows by 4 columns for a total of 12 application icons may be placed on the page. For example, when the user pulls down the display screen of the electronic device or when the electronic device automatically extends the display screen downward in condition of the electronic device being in an unextended state, the spacing of the three rows of application icons will increase with the increase of the extending distance. For example, when the extending distance is increased to 4 cm, the spacing between each row is increased by 2 cm. For another example, when the extending distance is increased to 3 cm, the spacing of each row is increased by 1.5 cm.

In some embodiments, the step of "increasing a spacing of application icons on a current desktop in the extending-retracting direction" may include the following operations.

(1) increasing the spacing of the application icons in the extending-retracting direction until the retractable display screen stopped extending.

For example, when the retractable display screen is extended from the small-screen state shown in FIG. 7, the row spacing of the three rows of application icons on the current desktop increases with the extending distance until the retractable display screen stops extending.

In some embodiments, the step of "increasing the spacing of the application icons in the extending-retracting direction until the retractable display screen stops extending" may include the following operations.

synchronously increasing the spacing of the application icons in the extending-retracting direction as the extending distance increases, until the retractable display screen is stopped extending.

For example, in the process of increasing the extending distance, the row spacing of the application icons also gradually increases, and when the retractable display screen stops extending, the row spacing of the application icon also stops increasing. In this case, the increase of the row spacing of the application icons has a gradient effect, that is, the effect of gradually extending the row spacing.

In some embodiments, the step of "increasing a spacing of application icons on a current desktop in the extending-retracting direction" may include the following operations.

(2) continuing to increase the spacing of the application icons in the extending-retracting direction in response to the spacing of the application icons in the extending-retracting direction being less than a first spacing, where the first spacing is greater than the spacing of the application icons in the extending-retracting direction when the retractable display screen is in the unextended state.

When the retractable display screen is in the unextended state, the spacing of the application icons in the extending-retracting direction is the row spacing in the small-screen state shown in FIG. 7. For example, when the row spacing in the small-screen state is 1 cm, the first spacing may be 3 cm. When the retractable display screen starts to extend from the small-screen state, the row spacing also increases. When the row spacing of the application icon is less than 3 cm, the row spacing of the application icons continues to increase. The first distance may be set according to desktop layout and visual effects.

In some embodiments, the step of "increasing a spacing of application icons on a current desktop in the extending-retracting direction" may include the following operations.

(3) stopping increasing the spacing of the application icons in the extending-retracting direction in response to the spacing of the application icons in the extending-retracting direction being equal to the first spacing.

When the retractable display screen is in the unextended state, the spacing of the application icons in the extending-retracting direction is the row spacing in the small-screen state shown in FIG. 7. In the small-screen state, when the row spacing is 1 cm, the first spacing may be 3 cm. When the retractable display screen is extended, the row spacing also increases. When the row spacing of the application icon is increased from 1 cm to 3 cm, the row spacing of the application icons is no longer increased. The first distance may be set according to desktop layout and visual effects.

For example, referring to FIG. 10, from the state of FIG. 7 to the state of FIG. 10, the row spacing increases from a fixed value 1 to a fixed value 2, and the row spacing of the application icon is stopped increasing after increasing to the state of FIG. 10. As illustrated in FIG. 10, a bottom of a display region of the application icons on the current desktop maintains a fixed distance from a bottom of the current desktop, for example, a fixed value 3, so as to keep the desktop layout of the retractable display screen after extension consistent with the desktop layout of the retractable display screen in the unextended state. The fixed value 3 may be an artificially set value.

It can be seen from the above that in the embodiments, when the retractable display screen is extended and retracted, the changing distance of the retractable display screen in the extending-retracting direction is obtained, and when the changing distance is an extending distance, the spacing of the application icons on the current desktop in the extending-retracting direction is increased, which enhances the flexibility of the arrangement of application icons on the display region during the extending or retracting of the retractable display screen.

According to the method described in the previous embodiments, the following examples will be used for further detailed description. Referring to FIG. 11, FIG. 11 is a flowchart of a device control method according to further another embodiment of the present disclosure. The device control method may be applied to an electronic device, and the electronic device may include a retractable display screen. The flow of the device control method may include operations at blocks illustrated herein.

At block 301: obtaining a changing distance of the retractable display screen in an extending-retracting direction in response to the retractable display screen being extended or retracted.

For example, the changing distance may be obtained by a distance increased in the extending-retracting direction of the display region after the current extension-and-retraction relative to the display region without the current extension-and-retraction.

It should be noted that, since the vertical extension-and-retraction and lateral extension-and-retraction are only different in direction, and the display mode of the adjusted application icons on the desktop is the same, the embodiments use the vertical extension-and-retraction as an example.

At block 302: increasing a spacing of application icons on a current desktop in the extending-retracting direction in response to the changing distance being an extending distance.

Since the embodiments discuss the case of vertical extension-and-retraction, that is, the retractable display screen extends or retracts in the vertical direction, and the row spacing of the application icons will change with the extension or retraction, the spacing of the application icons in the extending-retracting direction herein is a row spacing.

For example, when the extending distance increases, the row spacing of the application icons on the current desktop is correspondingly increased.

For example, referring to FIG. 7, in the small-screen state, when the user pulls down the display screen of the electronic device or the electronic device automatically extends the display screen downward, the row spacing of these three rows of application icons will increase with the increase of the extending distance.

At block 303: stopping increasing the spacing of the application icons in the extending-retracting direction in response to the spacing of the application icons in the extending-retracting direction being equal to a first spacing.

For example, referring to FIG. 7, the first spacing is a fixed value 2, and in the small-screen state, the row spacing of application icons other than the application icons of resident applications is a fixed value 1. When the user pulls down the screen of the electronic device or the electronic device automatically extends the screen downward, the spacing of each row of application icons will increase from the fixed value 1 to the fixed value 2, and the row spacing of the application icons will be increased to the fixed value 2 and then does not increase again. The case where the row spacing of the application icons increases to the fixed value 2 may be seen in FIG. 10.

The fixed value 1 and the fixed value 2 may be both artificially set constants.

For example, the fixed value 1 may take a value of 1 centimeter, and the fixed value 2 may take a value of 2 centimeters.

At block 304: after an initial moment at which the spacing of the application icons in the extending-retracting direction is equal to the first spacing, increasing a number of the application icons displayed on the current desktop in response to a newly added extending distance being greater than a first distance.

In some embodiments, when the first distance is a sum of a length of the application icons in the extending-retracting direction and the first spacing, that is, when the first distance is a sum of the side length of the application icons and the first spacing, the application icons may be arranged as follows.

Among them, since the embodiments take vertical extension-and-retraction as an example, the length of the application icons in the extending-retracting direction corresponds to the longitudinal side length, that is, corresponds to the side length of the application icons in FIG. 7.

Figure 12:
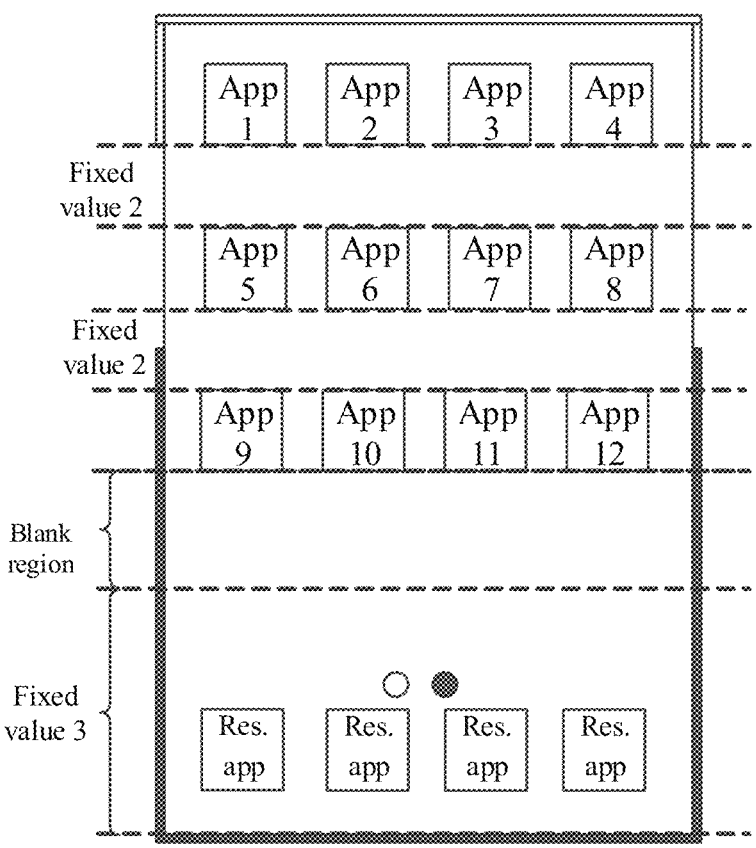
FIG. 12 is a schematic view of a corresponding change in the number of application icons on a current desktop as a changing distance of a retractable display screen changes according to an embodiment of the present disclosure.

For example, as shown in FIG. 12, after the row spacing of the application icons is increased to the first spacing, the row spacing will not be increased. At this time, when the retractable display screen continues to extend, a blank region will appear on the current desktop. When the blank region can just accommodate another row of application icons, the newly added extending distance is just a sum of the side length of the another row of application icons and the first spacing. In this case, icons on another desktop are moved to the current desktop for arrangement as the last row of application icons in the current desktop.

Figure 13:
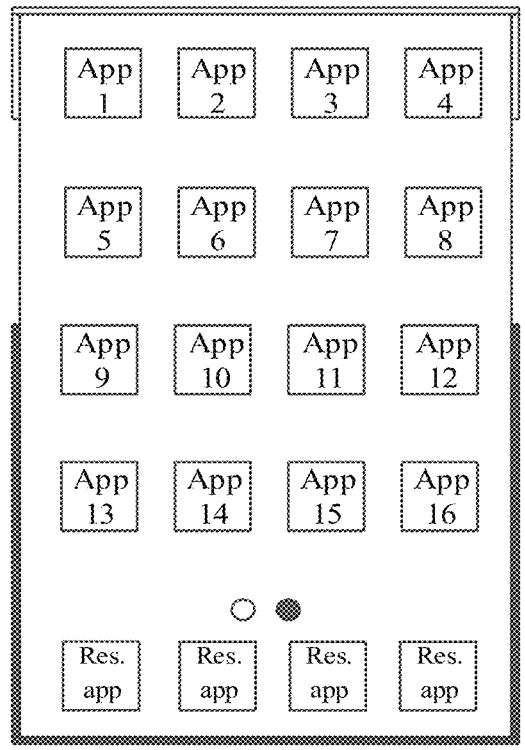
FIG. 13 is another schematic view of a corresponding change in the number of application icons on a current desktop as a changing distance of a retractable display screen changes according to an embodiment of the present disclosure.

For example, referring to FIG. 13, FIG. 13 is a schematic view when the newly added extending distance is exactly equal to the sum of the side length of an application icon and the first spacing. In this case, excluding the application icons of resident applications, the current desktop contains 4 rows by 4 columns, a total of 16 application icons, and the second page desktop contains 2 rows by 4 columns, a total of 8 application icons. The number of all the application icons is still 24.

The increase herein in the row spacing of the application icons has an effect of jumping, that is, when the new display region of the retractable display screen can accommodate another row of application icons, application icons of another desktop are moved to the current desktop for arrangement.

In some embodiments, when the first distance is the first spacing, the arrangement of the application icons may be as follows.

For example, as shown in FIG. 12, after the row spacing of the application icons is increased to the first spacing, the row spacing will not be increased. At this time, when the retractable display screen continues to extend, a blank region will appear on the current desktop. When the newly added extending distance is greater than the first spacing, application icons of another desktop may begin to gradually display from a top of the application icons. Until the newly added extending distance is just a sum of the side length of the application icon and the first spacing, the application icons of another desktop may be displayed entirely on the current desktop as the last row of application icons on the current desktop. The display herein of the application icons on the desktop is a gradual display process.

As shown in FIG. 12, the blank region is a region added to the retractable display screen between the bottom of the display region of the application icons on the current desktop and an edge which takes a distance of the fixed value 3 from the bottom of the current desktop. The side length of the blank region may be the fixed value 3, to keep the desktop layout consistent with the retractable display screen when it is not extended. By analogy, when the newly added extending distance is greater than the first spacing, the application icons of another desktop are moved to the current desktop for arrangement until the retractable display screen is fully extended.

Figure 14:
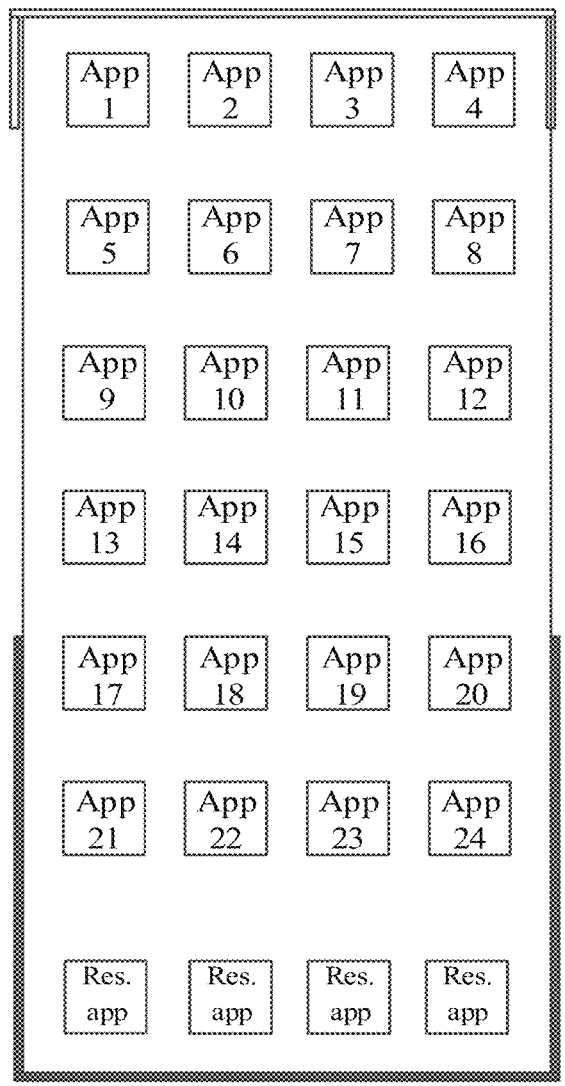
FIG. 14 is another schematic view of a corresponding change in the number of application icons on a current desktop as a changing distance of a retractable display screen changes according to an embodiment of the present disclosure.

For example, in the small-screen state as shown in FIG. 7, in addition to the application icons of resident applications, a maximum of 3 rows by 4 columns, a total of 12 application icons, may be arranged on the page, and the row spacing of each row of application icons is the fixed value 1. In the large-screen state as shown in FIG. 14, in addition to the application icons of resident applications, a maximum of 6 rows by 4 columns, a total of 24 application icons, may be arranged on the page, and the row spacing of each row of application icons is the fixed value 2. Taking the small-screen state extending to the large-screen state as an example, the first spacing is set to be the fixed value 2. When the row spacing of the application icons increases from the fixed value 1 to the fixed value 2, the row spacing is stopped increasing, and the newly added extending distance is calculated at this time. When the newly added extending distance gradually increases until the blank region generated on the current desktop can accommodate a row of application icons, the application icons on another desktop are moved to the current desktop for arrangement. Then when the newly added extending distance continues to increase, such that the blank region generated on the current desktop can accommodate an a row of application icons, the application icons on another desktop are continued to be moved to the current desktop for arrangement, until all the application icons on the desktop on the second page are moved to the current desktop. Referring to FIG. 14, in addition to the application icons of the resident applications, the current desktop contains 6 rows by 4 columns, a total of 24 application icons. At this time, the number of dots at the bottom of the page indicating the page number will change from two to one, or the dot disappears directly, indicating that the user currently has only one page of the desktop.

In some embodiments, in cases where all the application icons on the desktop on the second page are moved to the current desktop, when the retractable display screen is still extended, the row spacing of the application icons may be kept unchanged, and only the distance between the bottom of the display region of the application icons and the bottom of the current desktop may be increased.

It should be noted that the above-mentioned embodiments are based on the situation that every application icon position on each desktop is occupied. When an application icon position on the desktop is vacant, since the order of the application icons on each desktop may have been adjusted by the user based on the user's usage habits, the vacant application icon position may be retained for application icon arrangement in order to retain the user's memory of the layout of different application icons.

In some embodiments, when there is one of the application icon positions being vacant on the current desktop, the vacant application icon position may be retained. When the application icons of another desktop are moved to the current desktop for arrangement, the vacant row on the other desktop may be moved, or the vacant position on the other desktop may be moved to the current desktop without filling any application icon onto, retaining the vacant application icon positions.

For example, when there are 3 application icon positions vacant in the first row of the desktop on the next page of the current desktop, for example, the vacant application icon positions are positions of application 14, application 15 and application 16, then when the retractable display screen is extended to that the distance between the application icons in the last row of the current desktop and the bottom of the current display region satisfies a preset threshold, only the application 13 is moved to the last row of the current desktop, retaining the vacant application icon positions.

In some embodiments, when the application icons of another desktop are moved to the current desktop for arrangement, either the application icons on the desktop of the next page of the current desktop may be moved to the current desktop, or application icons on any other desktop may be moved to the current desktop.

In addition, in a case where the application icons on each desktop page are not necessarily fully occupied, that is, where there is at least one application icon position being vacant, it is also possible to determine whether all the application icon positions on the current desktop are occupied. When the application icon positions on the current desktop are not all occupied, the application icon of an application that the user uses the most frequently may be selected from another desktop to fill the vacant application icon position.

In some embodiments, when the number of desktops of the electronic device is two, and the current desktop is the last page, when the retractable display screen is extended to a fully extended state, the application icons on the desktop of the previous page may be moved to the current desktop for arrangement, and the row spacing of the application icons satisfies the first spacing.

For example, when the user is in the small-screen state and the user scrolls to the last desktop, the user pulls down the electronic device. At this time, a blank region will be displayed under the application icons of the current desktop of the electronic device, and a region between the application icons in the last row of the current desktop and the application icons of the resident applications is the blank region. As soon as the user fully extends the display screen, the application icons on the desktop of the previous page may be moved to the current desktop for arrangement, that is, the two pages are merged into one page, and a final page formed may be seen in FIG. 14.

It should be noted that when the application icons on the desktop of the previous page are moved to the current page for arrangement, there may be various arrangements, either in the order of application icons between rows in FIG. 13, or by disrupting the order of application icon rows.

In some embodiments, when the number of desktops of the electronic device is greater than two, and the current desktop is the last page, then when the retractable display screen is extended to a fully extended state, in response to the row spacing of the application icons reaching the first spacing, the number of rows of application icons that can be contained on the current desktop is determined.

Figure 15:
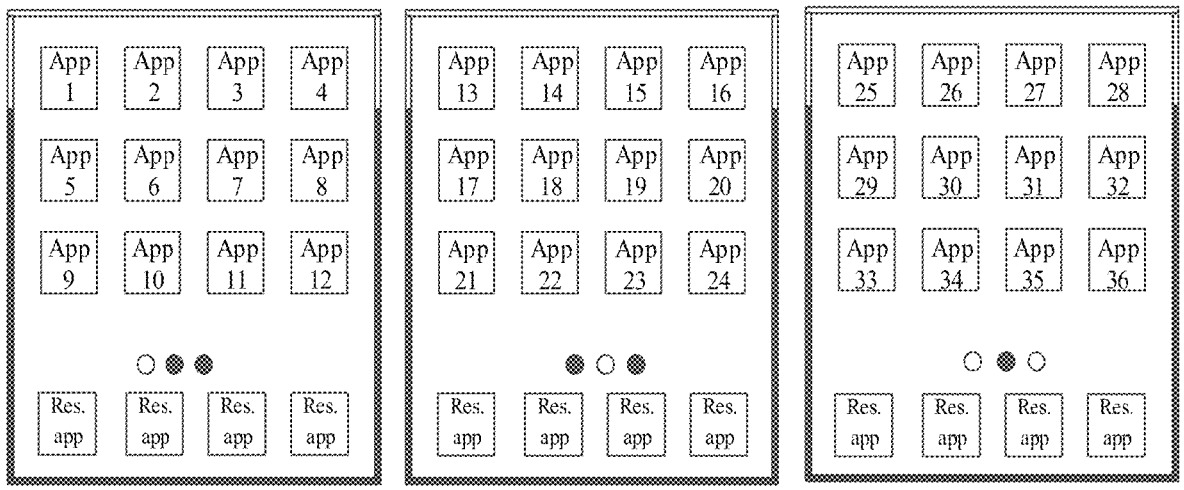
FIG. 15 is a schematic view of a corresponding change in a spacing of application icons on a current desktop in an extending-retracting direction and/or a corresponding change in the number of application icons on a current desktop as a changing distance of the retractable display screen changes according to an embodiment of the present disclosure.

For example, in the small-screen state, there are three desktop pages on the electronic device, as shown in FIG. 15. Each desktop page has 3 rows by 4 columns, a total of 12 application icons, and a total of 36 application icons are contained in the three pages. In a case where the current desktop is the last page, when the retractable display screen is extended to a fully extended state, the current desktop can accommodate another three rows of application icons, and the application icons may be obtained from other desktops according to the number of rows and filled into the current desktop, that is, three rows of application icons from other desktops are moved to the current desktop.

In some embodiments, also in the small-screen state as shown in FIG. 15, there are three desktop pages on the electronic device. Each desktop page has 3 rows by 4 columns, a total of 12 application icons, and a total of 36 application icons are contained in the three pages. In a case where the current desktop is the last page, when the retractable display screen is extended to a fully extended state, that is, a large-screen state, the electronic device will rearrange the application icons on all the desktops according to the arrangement of 6 rows by 4 columns. For example, after rearrangement, the desktop on the first page has 6 rows by 4 columns, a total of 24 application icons, and the desktop on the second page has 3 rows by 4 columns, a total of 12 application icons, and the desktop currently displayed is the desktop on the second page. For another example, after rearrangement, the desktop on the first page has 3 by 4 columns, a total of 12 application icons, and the desktop on the second page has 6 rows by 4 columns, a total of 24 application icons, and the desktop currently displayed is the desktop on the second page. The sum of the application icons on all desktops remains the same. The row spacing between application icons is the fixed value 2.

In some embodiments, in order not to disturb the arrangement order and layout of the application icons extending from the small-screen state to the large-screen state of the electronic device, the application icons may be arranged according to the parity of the page number of the current desktop.

For example, referring to FIG. 15, in the small-screen state, there are three desktop pages on the electronic device. Each desktop page has 3 rows by 4 columns, a total of 12 application icons, and a total of 36 application icons are contained in the three pages.

(1) When the page number of the current desktop is odd, application icons on the desktop of the next page of the current desktop are moved to the current desktop.

Specifically, the first row of application icons on the desktop of the next page of the current desktop is taken as the last row of application icons on the adjusted current desktop, and the row spacing of the application icons is the first spacing.

Figure 16:
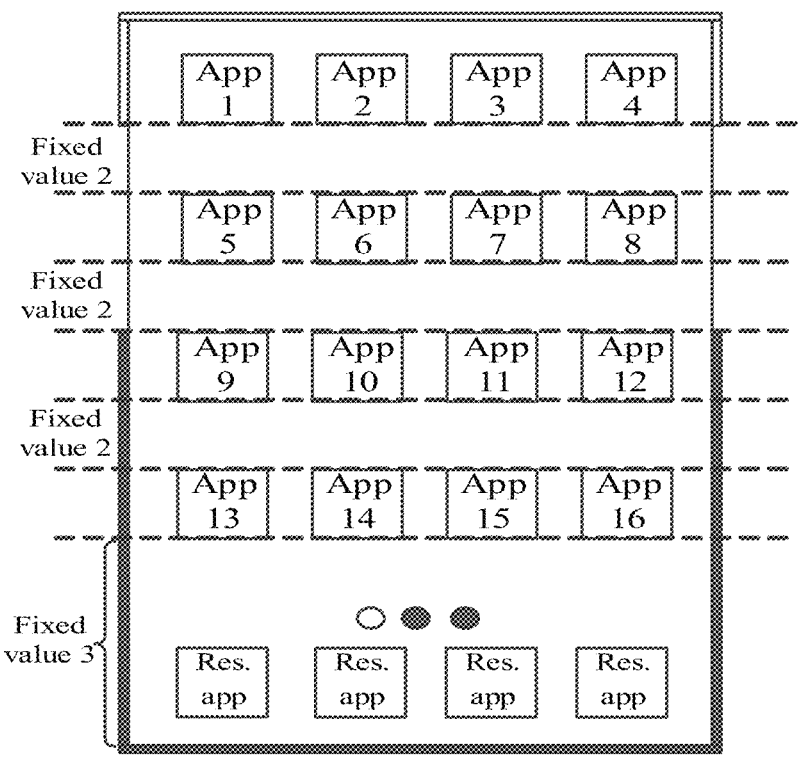
FIG. 16 is another schematic view of a corresponding change in a spacing of application icons on a current desktop in an extending-retracting direction and/or a corresponding change in the number of application icons on a current desktop as a changing distance of the retractable display screen changes according to an embodiment of the present disclosure.

For example, when the current desktop is the first page, the page number being odd, and when the newly added extending distance of the retractable display screen increases to just accommodate one row of application icons, the first row of application icons on the second page of the desktop is moved to the current desktop as the last row of application icons on the adjusted current desktop, as shown in FIG. 16, and the row spacing between the application icons is the first spacing.

And so on, until all the application icons on the desktop on the second page are moved to the current desktop.

Figure 17:
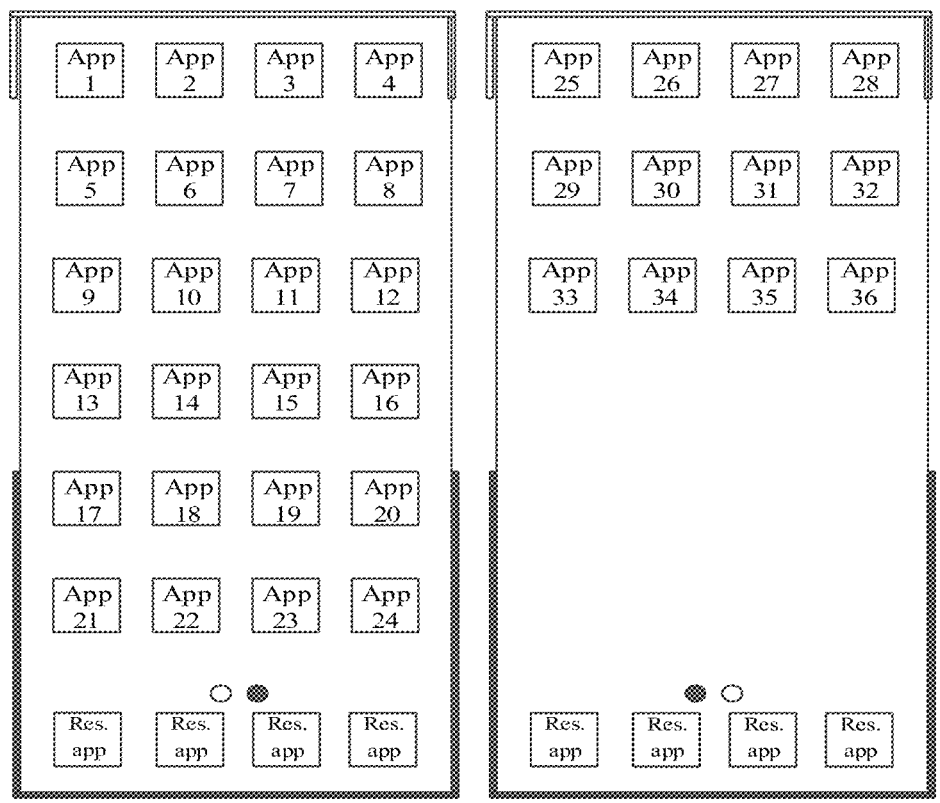
FIG. 17 is another schematic view of a corresponding change in a spacing of application icons on a current desktop in an extending-retracting direction and/or a corresponding change in the number of application icons on a current desktop as a changing distance of the retractable display screen changes according to an embodiment of the present disclosure.

Referring to the schematic view of the desktop on the first page in FIG. 17, except the application icons of the resident applications, the current desktop contains 6 rows by 4 columns, a total of 24 application icons, and the desktop on the second page contains 3 rows by 4 columns, a total of 12 application icons. The sum of all the application icons is still 36. In this case, the dots at the bottom of the page indicating the page number will change from three dots to two dots, indicating that the user currently has two desktop pages.

For another example, when the current desktop is the third page, the page number being odd, the application icons on the desktop of the next page of the third page are supposed to be moved to the current desktop, but the current desktop has only three pages. In this case, the arrangement of application icons on the current desktop changes only in terms of the row spacing of the application icons. That is, as the extending distance increases, the row spacing is increased to the first spacing, and the spacing is maintained. The desktops of the original first page and second page are merged into a single desktop in a regular arrangement of 6 rows by 4 columns, and the desktop of the original third page, also the current desktop after adjustment, may be illustrated by the desktop of the second page in FIG. 17. In this case, except the application icons of resident applications, the current desktop contains 3 rows by 4 columns, a total of 12 application icons, and the desktop on the first page contains 6 rows by 4 columns, a total of 24 application icons. The sum of all the application icons is still 36.

(2) When the page number of the current desktop is even, application icons on the desktop of the previous page of the current desktop are moved to the current desktop.

Specifically, the last row of application icons on the desktop of the previous page of the current desktop is taken as the first row of application icons on the adjusted current desktop, and the row spacing of the application icons is the first spacing.

Figure 18:
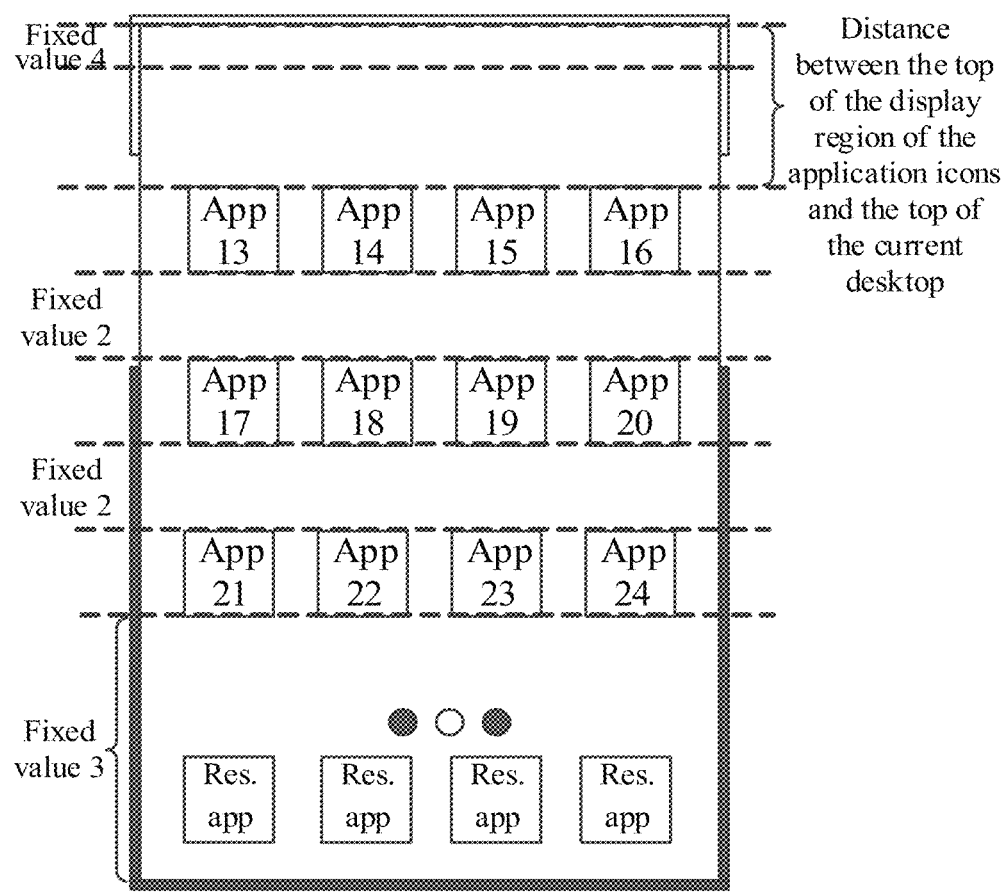
FIG. 18 is another schematic view of a corresponding change in a spacing of application icons on a current desktop in an extending-retracting direction and/or a corresponding change in the number of application icons on a current desktop as a changing distance of the retractable display screen changes according to an embodiment of the present disclosure.
Figure 19:
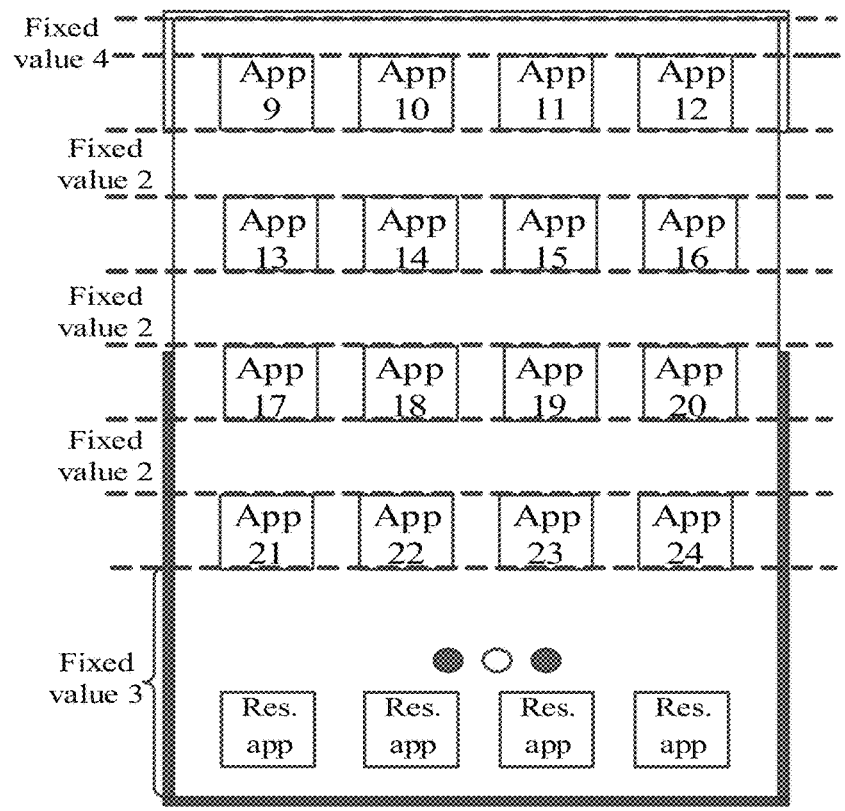
FIG. 19 is another schematic view of a corresponding change in a spacing of application icons on a current desktop in an extending-retracting direction and/or a corresponding change in the number of application icons on a current desktop as a changing distance of the retractable display screen changes according to an embodiment of the present disclosure.

For example, when the current desktop is the second page, the page number being even, FIG. 18 shows the distance between the top of the display region of the application icons and the top of the current desktop, and the retractable display screen is extended to that the distance from the top of the display region of the application icons of the current desktop to the top of the current desktop is just enough to accommodate another row of application icons. When the retractable display screen is extended to that the distance from the top of the display region of the application icons of the current desktop to the top of the current desktop is just enough to accommodate another row of application icons, the last row of application icons in the desktop on the first page is moved to the current desktop as the first row of application icons on the adjusted current desktop, and the row spacing between the application icons is the first spacing. Referring to FIG. 19, which shows moving the last row of icons on the desktop of the previous page to the current desktop as the first row of the current desktop. Among them, the bottom of the display region of the application icons on the current desktop also maintains a fixed distance from the bottom of the current desktop, such as the fixed value 3, and the top of the display region of the application icons on the current desktop maintains a fixed distance from the top of the current desktop, such as the fixed value 4, to keep the desktop layout the same as when the retractable display screen is not extended yet. The specific fixed distance may be set through the desktop layout settings.

And so on, until all the application icons on the desktop on the first page are moved to the current desktop. Referring to the schematic view of the desktop on the first page in FIG. 17, except the application icons of the resident applications, the current desktop contains 6 rows by 4 columns, a total of 24 application icons, and the desktop on the second page contains 3 rows by 4 columns, a total of 12 application icons. The sum of all the application icons is still 36. In this case, the dots at the bottom of the page indicating the page number will change from three dots to two dots, indicating that the user currently has two desktop pages.

In some embodiments, when the application icon positions on the current desktop are not all occupied, the application icon of an application that is most frequently used by the user may be selected from another desktop to fill the vacant application icon position. For example, when the current desktop is adjusted to the desktop on the second page as shown in FIG. 17, assuming that the application icon 30 is vacant on the current desktop, the application that has been used the most on the first page for example, the application 6 on the first page, may be selected and filled in the vacant application icon position 30.

For another example, when the current desktop is adjusted to the desktop on the second page as shown in FIG. 17, assuming that the application icons 26 and 31 are vacant on the current desktop, the applications in the first page are sorted by the number of times of use, and the more times an application is used the higher it is ranked. The top two applications in terms of number of uses, for example, application 7 and application 10, are selected and filled in the vacant application icon positions 26 and 31.

In addition, when the retractable display screen is extended to the large-screen state, except for the application icons of resident applications, the application icon positions of the current desktop are fully occupied, that is, 6 rows by 4 columns, a total of 24 application icons, are placed on the page. When the retractable display screen can still be extended, the distance between the bottom of the display region of the application icons and the bottom of the current desktop may be correspondingly increased.

It can be seen from the above that in the embodiments of the present disclosure, when the retractable display screen is extended, the spacing of the application icons in the extending-retracting direction is correspondingly increased, and when the spacing increases to the first spacing, the spacing is stopped increasing. When the changing distance continues to increase, in response to the display region increased by extending the retractable display screen can accommodate other application icons, the application icons of other desktops are moved to the current desktop for arrangement, so as to adjust the spacing of the application icons displayed on the current desktop in the extending-retracting direction and the number of the application icons in the extending-retracting direction, thereby enhancing the flexibility of the arrangement of application icons on the display region during the extending or retracting of the retractable display screen.

Figure 20:
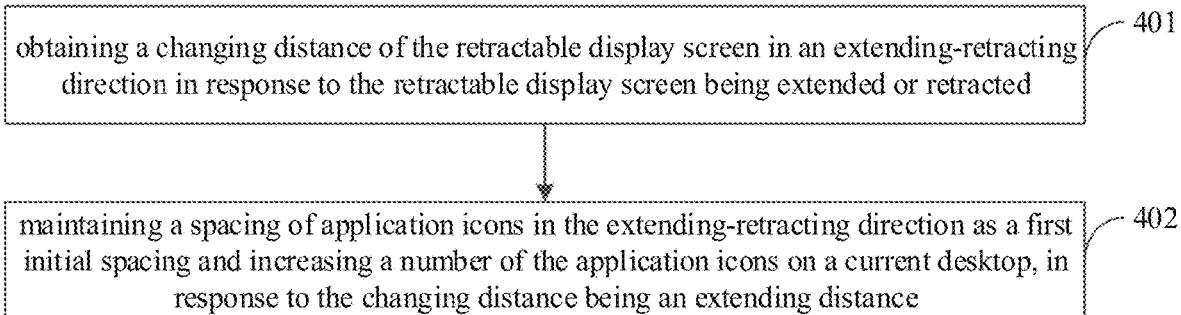
FIG. 20 is a flowchart of a device control method according to further another embodiment of the present disclosure.

According to the method described in the previous embodiments, the following examples will be used for further detailed description. Referring to FIG. 20, FIG. 20 is a flowchart of a device control method according to further another embodiment of the present disclosure. The device control method may be applied to an electronic device, and the electronic device may include a retractable display screen. The flow of the device control method may include operations at blocks illustrated herein.

At block 401: obtaining a changing distance of the retractable display screen in an extending-retracting direction in response to the retractable display screen being extended or retracted.

For example, the changing distance may be obtained by a distance increased in the extending-retracting direction of the display region after the current extension-and-retraction relative to the display region without the current extension-and-retraction.

It should be noted that, since the vertical extension-and-retraction and lateral extension-and-retraction are only different in direction, and the display mode of the adjusted application icons on the desktop is the same, the embodiments use the vertical extension-and-retraction as an example.

At block 402: maintaining a spacing of application icons in the extending-retracting direction as a first initial spacing and increasing a number of the application icons on a current desktop, in response to the changing distance being an extending distance.

Since the embodiments discuss the case of vertical extension-and-retraction, that is, the retractable display screen extends or retracts in the vertical direction, and the row spacing of the application icons will change with the extension or retraction, the spacing of the application icons in the extending-retracting direction herein is a row spacing.

For example, when the changing distance is the extending distance, that is, when the retractable display screen is extended, the row spacing of the application icons is maintained unchanged. When the changing distance continues to increase, the application icons are added according to the new blank region on the current desktop.

In some embodiments, the step "increasing a number of the application icons on a current desktop" further includes the following operations.

(1) increasing the number of the application icons displayed on the current desktop, in response to the extending distance being greater than a second distance.

In some embodiments, when the second distance is a sum of the length of each application icon in the extending-retracting direction and a first initial spacing, that is, when the second distance is the sum of the side length of the application icon and the first initial spacing, the arrangement of application icons may be as follows.

Among them, since the embodiments take vertical extension-and-retraction as an example, the length of the application icons in the extending-retracting direction corresponds to the longitudinal side length, that is, corresponds to the side length of the application icons in FIG. 7.

For example, as the retractable display screen is extended, a blank region will appear on the current desktop. When the blank region can just accommodate another row of application icons, the extending distance is just the second distance, which is the sum of the side length of the application icon and the first initial spacing. At this time, application icons on another desktop are moved to the current desktop for arrangement as the last row of application icons on the current desktop. By analogy, as the extending distance continues to increase, and when a newly added extending distance satisfies the second distance as the sum of the side length of the application icon and the first initial spacing, the application icons on another desktop are continuously moved to the current desktop for arrangement. The increase herein in the row spacing of the application icons has an effect of jumping, that is, when the new display region of the retractable display screen can accommodate another row of application icons, application icons of another desktop are moved to the current desktop for arrangement.

In some embodiments, when the second distance is the first initial spacing, the arrangement of the application icons may be as follows.

When the extending distance is greater than the first initial spacing, the application icons of another desktop may begin to gradually display from the top of the application icons. Until the extending distance is just the sum of the side length of the application icon and the first initial spacing, the application icons of another desktop are displayed entirely on the desktop as the last row of application icons on the current desktop. The display herein of the application icons on the desktop is a gradual display process.

It can be seen from the above that the embodiments of the present disclosure only increase the number of application icons on the current desktop when the changing distance is an extending distance, according to the extension and retraction of the retractable display screen. That is, due to the extending distance increasing, when the correspondingly increased display region of the current desktop of the retractable display screen can accommodate other application icons, the application icons of other desktops will be moved to the current desktop for arrangement, thereby enhancing the flexibility of the arrangement of application icons on the display region during the extending or retracting of the retractable display screen.

Figure 21:
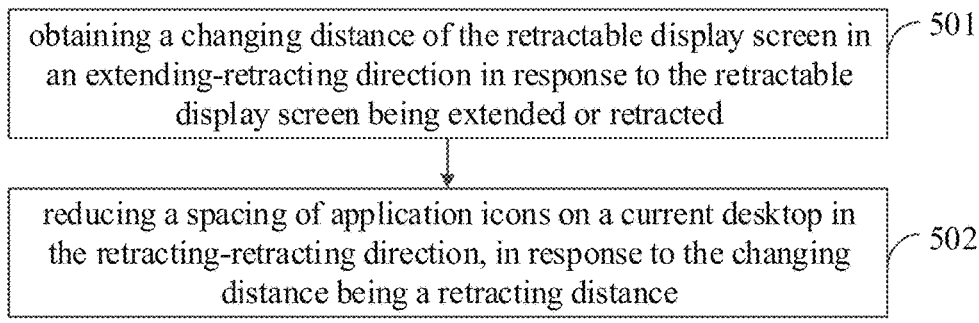
FIG. 21 is a flowchart of a device control method according to further another embodiment of the present disclosure.

According to the method described in the previous embodiments, the following examples will be used for further detailed description. Referring to FIG. 21, FIG. 21 is a flowchart of a device control method according to further another embodiment of the present disclosure. The device control method may be applied to an electronic device, and the electronic device may include a retractable display screen. The flow of the device control method may include operations at blocks illustrated herein.

At block 501: obtaining a changing distance of the retractable display screen in an extending-retracting direction in response to the retractable display screen being extended or retracted.

For example, the changing distance may be obtained by a distance increased in the extending-retracting direction of the display region after the current extension-and-retraction relative to the display region without the current extension-and-retraction.

It should be noted that, since the vertical extension-and-retraction and lateral extension-and-retraction are only different in direction, and the display mode of the adjusted application icons on the desktop is the same, the embodiments use the vertical extension-and-retraction as an example.

At block 502: reducing a spacing of application icons on a current desktop in the extending-retracting direction, in response to the changing distance being a retracting distance.

Since the embodiments discuss the case of vertical extension-and-retraction, the spacing of the application icons in the extending-retracting direction herein is a row spacing.

In some embodiments, the case where the changing distance is the retracting distance is actually a reverse process of the case where the changing distance is the extending distance described in the above embodiments.

For example, referring to FIG. 7, the electronic device is in an unextended state, that is, a small-screen state. Assuming that in the small-screen state, in addition to the application icons of resident applications, a maximum of 3 rows by 4 columns for a total of 12 application icons may be placed on the page. When the user pulls down the display screen of the electronic device or the electronic device automatically extends the display screen downward, the extending distance increases, and the spacing of the three rows of application icons increases with the increase of the extending distance. For example, when the extending distance is increased to 3 cm, the spacing between each row is increased by 1.5 cm. On the contrary, on the basis of the above extension, when the retracting distance is 3 cm, the row spacing of the application icon is reduced by 1.5 cm.

In some embodiments, the step of "reducing a spacing of application icons on a current desktop in the extending-retracting direction" further includes the following operations.

reducing the spacing of the application icons in the extending-retracting direction until the extendable display screen is stopped retracting.

That is, when the retractable display screen retracts, the row spacing of the application icons is correspondingly reduced, and when the retractable display screen stops retracting, the row spacing of the retractable display screen stops decreasing.

In some embodiments, the step of "reducing the spacing of the application icons in the extending-retracting direction until the extendable display screen is stopped retracting" further includes the following operations.

as the retracting distance decreases, synchronously reducing the spacing of the application icons in the extending-retracting direction until the retractable display screen is stopped retracting.

That is, when the retractable display screen retracts, the row spacing of the application icons decreases synchronously with the increase of the retracting distance. Until the retractable display screen stops retracting, the row spacing of the retractable display screen stops decreasing. In this case, the reduction of the row spacing of the application icons has a gradient effect, that is, the row spacing gradually retracts.

It can be seen from the above that in the embodiments, when the retractable display screen is retracted, the retracting distance is reduced, and the spacing of the application icons on the current desktop in the extending-retracting direction is correspondingly reduced, thereby enhancing the flexibility of the arrangement of application icons on the display region during the extending or retracting of the retractable display screen.

Figure 22:
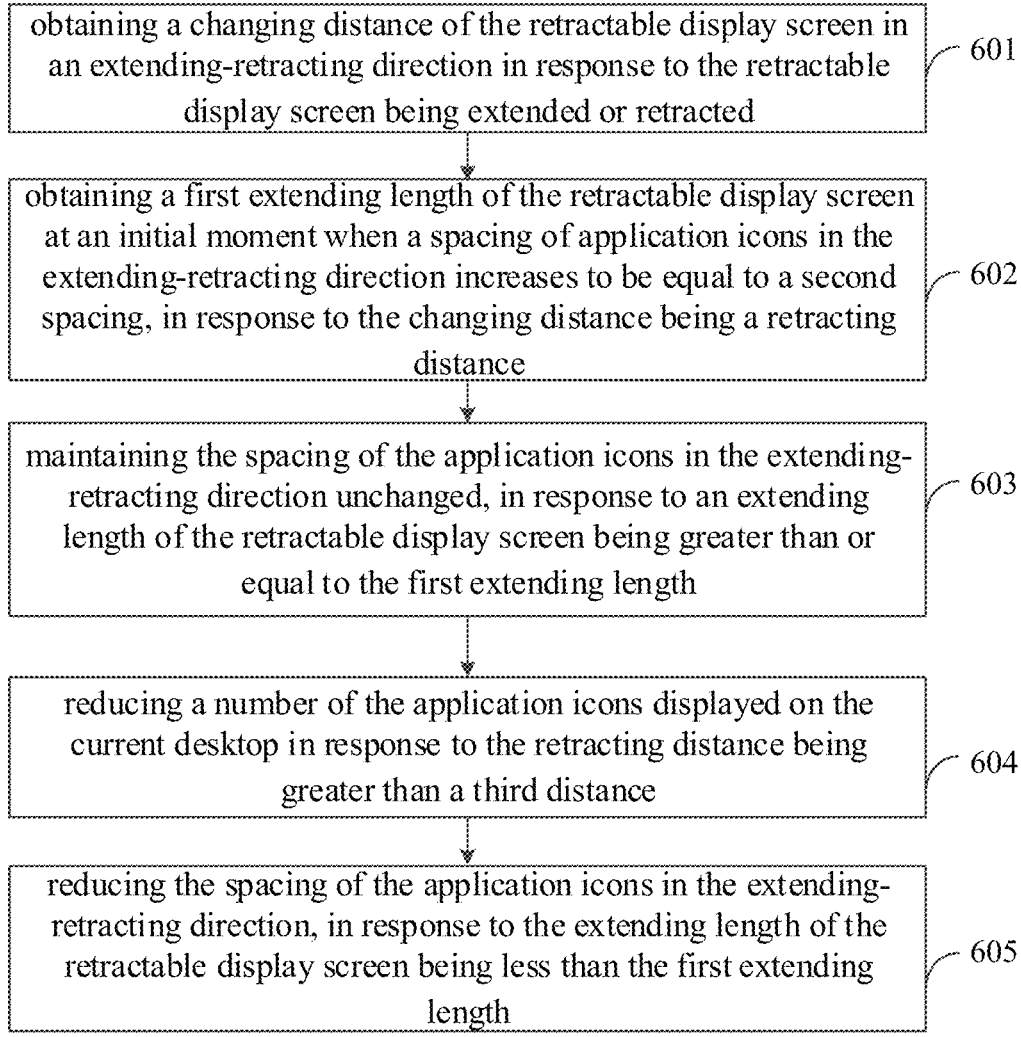
FIG. 22 is a flowchart of a device control method according to further another embodiment of the present disclosure.

According to the method described in the previous embodiments, the following examples will be used for further detailed description. Referring to FIG. 22, FIG. 22 is a flowchart of a device control method according to further another embodiment of the present disclosure. The device control method may be applied to an electronic device, and the electronic device may include a retractable display screen. The flow of the device control method may include operations at blocks illustrated herein.

At block 601: obtaining a changing distance of the retractable display screen in an extending-retracting direction in response to the retractable display screen being extended or retracted.

For example, the changing distance may be obtained by a distance increased in the extending-retracting direction of the display region after the current extension-and-retraction relative to the display region without the current extension-and-retraction.

It should be noted that, since the vertical extension-and-retraction and lateral extension-and-retraction are only different in direction, and the display mode of the adjusted application icons on the desktop is the same, the embodiments use the vertical extension-and-retraction as an example.

At block 602: obtaining a first extending length of the retractable display screen at an initial moment when a spacing of application icons in the extending-retracting direction increases to be equal to a second spacing, in response to the changing distance being a retracting distance.

In some embodiments, the case where the changing distance is the retracting distance is actually a reverse process of the case where the changing distance is the extending distance described in the above embodiments.

The extending length refers to a distance that the retractable display screen in the extended state extends relative to the retractable display screen in the unextended state.

For example, the large-screen state of FIG. 14 retracting to the small-screen state of FIG. 7 is taken as an example. In the small-screen state, in addition to the application icons of resident applications, a maximum of 3 rows by 4 columns, a total of 12 application icons, can be placed on the page, and the row spacing of each row of application icons is a fixed value 1. In the large-screen state, in addition to the application icons of resident applications, a maximum of 6 rows by 4 columns, a total of 24 application icons, can be placed on the page, and the row spacing of each row of application icons is a fixed value 2. The second spacing may be set to the fixed value 2, that is, when the row spacing increases from the fixed value 1 to the fixed value 2 as the electronic device extending from the small-screen state to the large-screen state, the extending length of the retractable display screen is first extending length. The first extending length is the distance that the retractable display screen extends relative to the unextended state when the row spacing of the application icons increases from the fixed value 1 to the fixed value 2.

At block 603: maintaining the spacing of the application icons in the extending-retracting direction unchanged, in response to an extending length of the retractable display screen being greater than or equal to the first extending length.

Also taking the example in step 602 as an example, when the retractable display screen is retracted, the distance of the retractable display screen extending relative to the unextended state is obtained as the extending length, and when the extending length reaches the first extending length, the row spacing of the application icons is kept unchanged, that is, the row spacing of the application icons is kept at the fixed value 2.

At block 604: reducing a number of the application icons displayed on the current desktop in response to the retracting distance being greater than a third distance.

Also taking the example in step 602 as an example, it should be noted that when adjusting the number of application icons on the current desktop in the embodiments, the spacing of the application icons in the extending-retracting direction is kept unchanged, that is, the row spacing is kept as the second spacing. The second distance in the corresponding example is the fixed value 2.

In some embodiments, when the third distance is a sum of the length of the application icon in the extending-retracting direction and the second spacing of the application icons in the extending-retracting direction, that is, when the third distance is the sum of the side length of the application icon and the second spacing, the arrangement of the application icons may be as follows.

Among them, since the embodiments take vertical extension-and-retraction as an example, the length of the application icons in the extending-retracting direction corresponds to the longitudinal side length, that is, corresponds to the side length of the application icons in FIG. 7.

Taking the retractable display screen in the large-screen state as a starting point to retract as an example, when the retractable display screen retracts to that the display region of the current desktop is reduced to the extent that it cannot accommodate one row of application icons, that is, when the retracting distance is the sum of the side length of the application icon and the second spacing, a row of application icons close to the retracting side may be moved to another desktop. By analogy, as long as the retracting distance is greater than the third distance and the retractable display screen continues to retract, the number of application icons will decrease as the display region on the current desktop decreases.

In some embodiments, the third distance is the second spacing of the application icons in the extending-retracting direction.

Taking the retractable display screen in the large-screen state as the starting point to retract as an example, when the retractable display screen retracts by the second spacing, and the retractable display screen continues to retract, the last row of application icons gradually starts to disappear from the bottom. Until the retracting distance is the sum of the side length of the application icon and the second spacing, the last row of application icons disappears completely. By analogy, when the retractable display screen continues to retract, the number of application icons on the current desktop is continued to reduce.

The application icon that disappears from the current desktop may be moved to another desktop. When there is no other desktop where the application icon can be placed, a new desktop may be created, and the disappeared application icon may be moved to the newly created desktop.

At block 605: reducing the spacing of the application icons in the extending-retracting direction, in response to the extending length of the retractable display screen being less than the first extending length.

For example, when the retractable display screen is retracted until the extending length is the first extending length, the number of application icons on the current desktop is stopped reducing. When the retractable display screen continues to retract, the row spacing of the application icons will be reduced.

When the extending length is the first extending length, it is a critical point for determining whether the spacing of the application icons starts to be reduced. When the extending length is less than the first extending length, the row spacing of the application icons may be reduced. An analogy may be drawn herein to the reverse process of the case where the changing distance is the extending distance described in the above embodiments.

For example, when the second spacing is the fixed value 2, as the retractable display screen continues to retract, the row spacing is reduced. When the retractable display screen is retracted to the unextended state, the row spacing of the application icons is just reduced to the fixed value 1.

It can be seen from the above that when the retractable display screen is retracted, the embodiments of the present disclosure reduce the number of application icons on the current desktop correspondingly, and the spacing of the application icons in the extending-retracting direction is kept unchanged. When the extending length is reduced to the first extending length, the spacing of the application icons in the extending-retracting direction starts to be reduced, thereby enhancing the flexibility of the arrangement of application icons on the display region during the extending or retracting of the retractable display screen.

Figure 23:
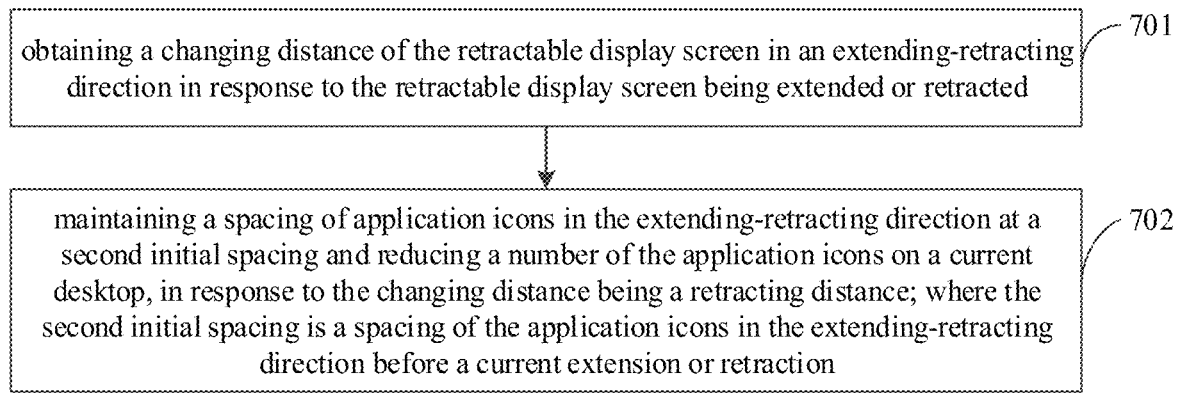
FIG. 23 is a flowchart of a device control method according to further another embodiment of the present disclosure.

According to the method described in the previous embodiments, the following examples will be used for further detailed description. Referring to FIG. 23, FIG. 23 is a flowchart of a device control method according to another embodiment of the present disclosure. The device control method may be applied to an electronic device, and the electronic device may include a retractable display screen. The flow of the device control method may include operations at blocks illustrated herein.

At block 701: obtaining a changing distance of the retractable display screen in an extending-retracting direction in response to the retractable display screen being extended or retracted.

For example, the changing distance may be obtained by a distance increased in the extending-retracting direction of the display region after the current extension-and-retraction relative to the display region without the current extension-and-retraction.

It should be noted that, since the vertical extension-and-retraction and lateral extension-and-retraction are only different in direction, and the display mode of the adjusted application icons on the desktop is the same, the embodiments use the vertical extension-and-retraction as an example.

At block 702: maintaining a spacing of application icons in the extending-retracting direction at a second initial spacing and reducing a number of the application icons on a current desktop, in response to the changing distance being a retracting distance; where the second initial spacing is a spacing of the application icons in the extending-retracting direction before a current extension or retraction.

That is, when the retractable display screen retracts, the row spacing of the application icons is kept as the row spacing before the retractable display screen is retracted. Also, the row spacing is unchanged, and only the number of application icons on the current desktop is reduced.

In some embodiments, the step "reducing a number of the application icons on a current desktop" include: reducing the number of the application icons on the current desktop in response to the retracting distance being greater than a fourth distance, which may include the following two parallel operations.

(1) The fourth distance is a sum of the length of the application icon in the extending-retracting direction and the second initial spacing.

Among them, since the embodiments take vertical extension-and-retraction as an example, the length of the application icons in the extending-retracting direction corresponds to the longitudinal side length, that is, corresponds to the side length of the application icons in FIG. 7.

Taking the retractable display screen in the large-screen state as a starting point to retract as an example, when the retractable display screen retracts to that the display region of the current desktop is reduced to the extent that it cannot accommodate one row of application icons, that is, when the retracting distance is the sum of the side length of the application icon and the second initial spacing, a row of application icons (corresponding to the last row herein) close to the retracting side may be moved to another desktop. By analogy, as long as the retracting distance is greater than the third distance and the retractable display screen continues to retract, the number of application icons will decrease as the display region on the current desktop decreases.

(2) The fourth distance is the second initial spacing.

Taking the retractable display screen in the large-screen state as the starting point to retract as an example, when the retractable display screen retracts by the second distance, and the retractable display screen continues to retract, the last row of application icons gradually starts to disappear from the bottom. Until the retracting distance is the sum of the side length of the application icon and the second initial spacing, the last row of application icons disappears completely. By analogy, when the retractable display screen continues to retract, the number of application icons on the current desktop is continued to reduce.

The application icon that disappears from the current desktop may be moved to another desktop. When there is no other desktop where the application icon can be placed, a new desktop may be created, and the disappeared application icon may be moved to the newly created desktop.

It can be seen from the above that when the retractable display screen is retracted, the changing distance is the retracting distance, and the embodiments of the present disclosure keep the spacing of the application icons in the extending-retracting direction unchanged, and the number of application icons on the current desktop is correspondingly reduced according to the retracting distance, thereby enhancing the flexibility of the arrangement of application icons on the display region during the extending or retracting of the retractable display screen.

To facilitate better implementation of the device control method provided by the embodiments of the present disclosure, embodiments of the present disclosure further provide a device control apparatus, the meaning of which is the same as that in the above-mentioned device control method, and the specific implementation details may refer to the descriptions in the method embodiments.

Figure 24:
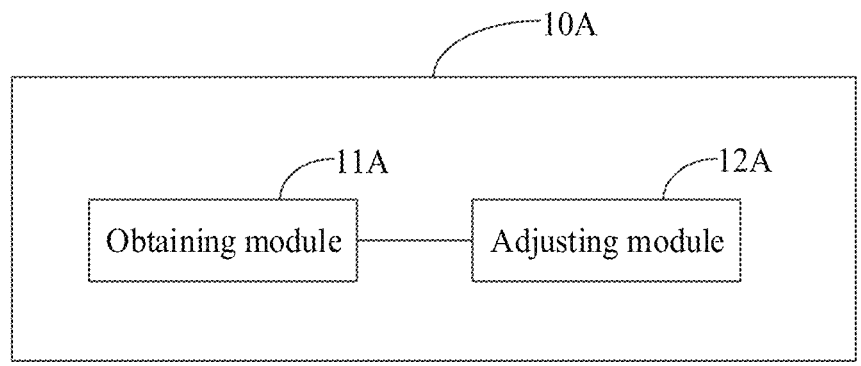
FIG. 24 is a structural schematic view of a device control apparatus according to an embodiment of the present disclosure.

Referring to FIG. 24, FIG. 24 is a structural schematic view of a device control apparatus according to an embodiment of the present disclosure. The device control apparatus 10A is applied to an electronic device, and the device control apparatus 10A includes: an obtaining module 11A and an adjusting module 12A.

The obtaining module 11A is configured to obtain a changing distance of the retractable display screen in an extending-retracting direction in response to the retractable display screen being extended or retracted.

The adjusting module 12A is configured to adjust a spacing of application icons in the extending-retracting direction displayed on a current desktop and/or a number of the application icons in the extending-retracting direction according to the changing distance.

In some embodiments, the adjusting module 12A is configured to increase the spacing of the application icons on the current desktop in the extending-retracting direction in response to the changing distance being an extending distance.

In some embodiments, the adjusting module 12A is configured to increase the spacing of the application icons in the extending-retracting direction until the retractable display screen is stopped extending.

In some embodiments, the adjusting module 12A is configured to synchronously increase the spacing of the application icons in the extending-retracting direction as the extending distance increases, until the retractable display screen is stopped extending.

In some embodiments, the adjusting module 12A is configured to continue to increase the spacing of the application icons in the extending-retracting direction in response to the spacing of the application icons in the extending-retracting direction being less than a first spacing, where the first spacing is greater than the spacing of the application icons in the extending-retracting direction when the retractable display screen is in an unextended state.

In some embodiments, the adjusting module 12A is configured to stop increasing the spacing of the application icons in the extending-retracting direction in response to the spacing of the application icons in the extending-retracting direction being equal to the first spacing.

In some embodiments, the adjusting module 12A is configured to, after an initial moment at which the spacing of the application icons in the extending-retracting direction is equal to the first spacing, increase the number of the application icons displayed on the current desktop in response to a newly added extending distance being greater than a first distance. The first distance may be a sum of a length of the application icons in the extending-retracting direction and the first spacing. The first distance may be the first spacing.

In some embodiments, the spacing of the application icons in the extending direction is set with a first initial spacing, and the first initial spacing is the spacing of the application icons in the extending-retracting direction when the retractable display screen is in the unextended state; the adjusting module 12A is configured to maintain the spacing of the application icons in the extending-retracting direction as the first initial spacing and increasing the number of the application icons on the current desktop, in response to the changing distance being the extending distance.

In some embodiments, the adjusting module 12A is configured to increase the number of the application icons displayed on the current desktop, in response to the extending distance being greater than a second distance. The second distance may be a sum of the length of each application icon in the extending-retracting direction and the first initial spacing. The second distance may be the first initial spacing.

In some embodiments, the adjusting module 12A is configured to reduce the spacing of the application icons on the current desktop in the extending-retracting direction, in response to the changing distance being a retracting distance.

In some embodiments, the adjusting module 12A is configured to reduce the spacing of the application icons in the extending-retracting direction until the extendable display screen is stopped retracting.

In some embodiments, the adjusting module 12A is configured to, as the retracting distance decreases, synchronously reduce the spacing of the application icons in the extending-retracting direction until the retractable display screen is stopped retracting.

In some embodiments, the adjusting module 12A is configured to obtain a first extending length of the retractable display screen at an initial moment when the spacing of the application icons in the extending-retracting direction increases to be equal to a second spacing, in response to the changing distance being a retracting distance; maintain the spacing of the application icons in the extending-retracting direction unchanged, in response to an extending length of the retractable display screen being greater than or equal to the first extending length; and reduce the spacing of the application icons in the extending-retracting direction, in response to the extending length of the retractable display screen being less than the first extending length.

In some embodiments, after the maintaining the spacing of the application icons in the extending-retracting direction unchanged, in response to an extending length of the retractable display screen being greater than or equal to the first extending length, the adjusting module 12A is further configured to reduce the number of the application icons displayed on the current desktop in response to the retracting distance being greater than a third distance. The third distance may be a sum of the length of the application icon in the extending-retracting direction and the second spacing of the application icons in the extending-retracting direction. The third distance may be the second spacing of the application icons in the extending direction.

In some embodiments, the adjusting module 12A is configured to maintain the spacing of the application icons in the extending-retracting direction at a second initial spacing and reduce the number of the application icons on the current desktop, in response to the changing distance being a retracting distance; where the second initial spacing is a spacing of the application icons in the extending-retracting direction before a current extension or retraction.

In some embodiments, the adjusting module 12A is configured to reduce the number of the application icons on the current desktop in response to the retracting distance being greater than a fourth distance. The fourth distance may be a sum of the length of the application icon in the extending-retracting direction and the second initial spacing. The fourth distance may be the second initial spacing.

It should be noted that the device control apparatus provided by the embodiments of the present disclosure and the device control method in the above embodiments belong to the same concept, and any method provided in the device control method embodiments can be implemented by the device control apparatus. For details of the process, reference may be made to the embodiments of the device control method, which will not be repeated here.

As can be seen from the above, in the present disclosure, the obtaining module 11 is configured to obtain a changing distance of the retractable display screen in an extending-retracting direction in response to the retractable display screen being extended or retracted; and the adjusting module 12A is configured to adjust a spacing of application icons in the extending-retracting direction displayed on a current desktop and/or a number of the application icons in the extending-retracting direction according to the changing distance. In this solution, according to the changing distance of the retractable display screen of the electronic device in the extending-retracting direction, the spacing of the application icons in the extending-retracting direction of the application icons displayed on the current desktop and/or the number of the application icons in the extending-retracting direction are correspondingly adjusted, such that the layout of application icons on the display region changes accordingly with the changing distance during the extending or retracting of the retractable display screen, thereby enhancing the flexibility of the arrangement of application icons on the display region during the extending or retracting of the retractable display screen.

Embodiments of the present disclosure further provide a computer-readable storage medium on which a computer program is stored, and when the computer program is executed on a computer, the computer is caused to execute the process in the device control method provided by the above embodiments.

Embodiments of the present disclosure further provide an electronic device, including a memory and a processor, where the processor is configured to execute the process in the device control method provided by the present embodiment by invoking a computer program stored in the memory.

Figure 25:
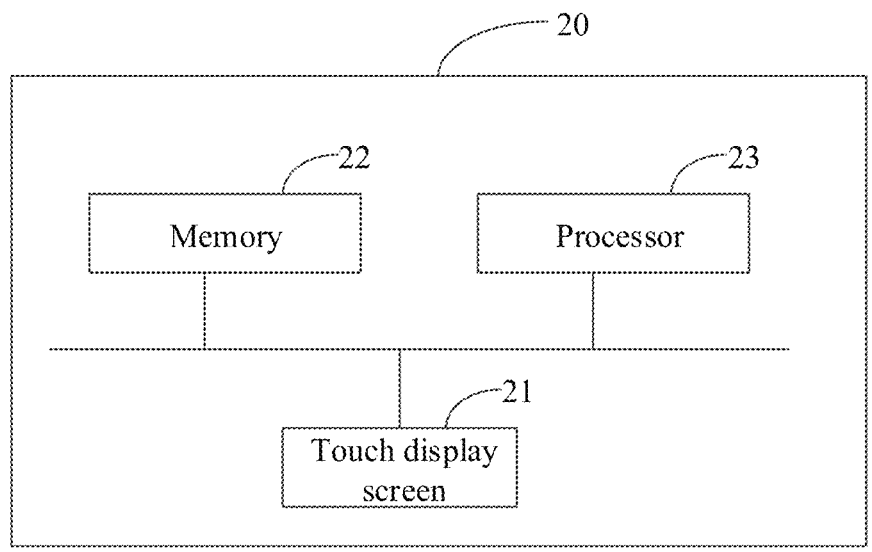
FIG. 25 is a structural schematic view of an electronic device according to an embodiment of the present disclosure.

For example, the above-mentioned electronic device may be a mobile terminal such as a tablet computer or a smart phone. Referring to FIG. 25, FIG. 25 is a structural schematic view of an electronic device according to an embodiment of the present disclosure.

The electronic device 20 may include a touch display screen 21, a memory 22, a processor 23, etc. Those skilled in the art can understand that the structure of the electronic device shown in FIG. 25 does not constitute a limitation on the electronic device, and may include more or less components than the one shown, or combine some components, or arrange different components.

The touch display screen 21 may be a retractable touch display screen. The retractable touch display screen may be a touch display screen capable of extending and retracting. The retractable touch display screen may be a flexible display, which can be bent, rolled, folded, etc. On the electronic device arranged with a retractable touch display, the visible size of the screen may be increased by extending the screen, and the visible size of the screen may be reduced by retracting the screen.

The memory 22 may be configured to store an application program and data. The application program stored in the memory 22 contains executable code. The application program may be composed of various functional modules. The processor 23 executes various functional applications and data processing by executing the application program stored in the memory 22.

The processor 23 is a control center of the electronic device and connects various parts of the entire electronic device using various interfaces and lines to perform various functions of the electronic device and process data by running or executing applications stored in the memory 22 and calling data stored in the memory 22, thereby monitoring the electronic device as a whole.

In the embodiments, the processor 23 in the electronic device loads the executable code corresponding to the processes of one or more application programs into the memory 22 in accordance with the following instructions, and the processor 23 runs the application programs stored in the memory 22 so as to execute the following.

obtaining a changing distance of the retractable display screen in an extending-retracting direction in response to the retractable display screen being extended or retracted.

adjusting a spacing of application icons in the extending-retracting direction displayed on a current desktop and/or a number of the application icons in the extending-retracting direction according to the changing distance.

Figure 26:
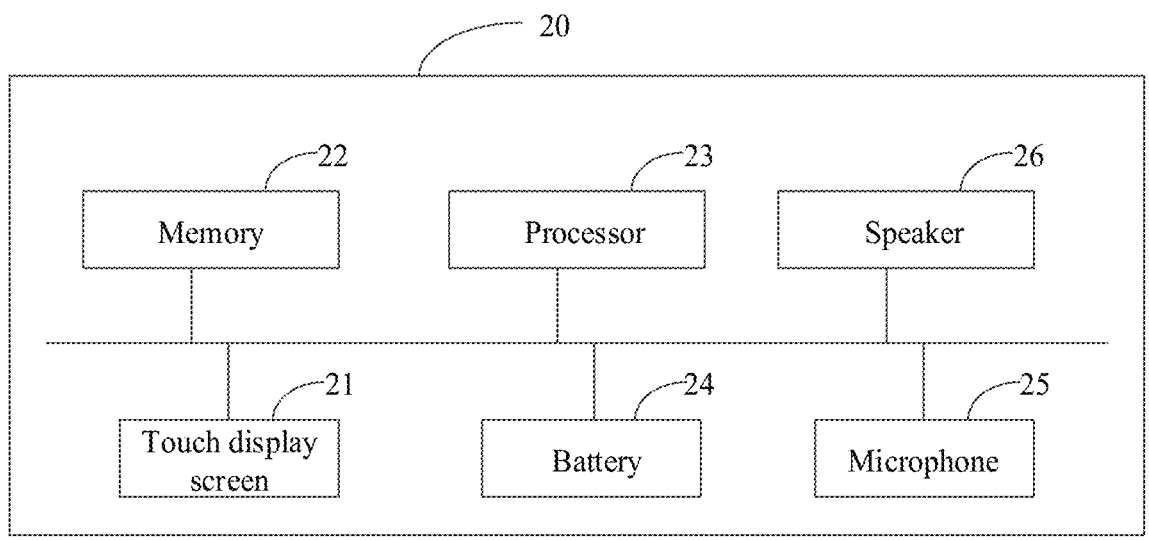
FIG. 26 is a structural schematic view of an electronic device according to another embodiment of the present disclosure.

Referring to FIG. 26, FIG. 26 is a structural schematic view of an electronic device according to another embodiment of the present disclosure. The electronic device 20 may include components such as a touch display screen 21, a memory 22, a processor 23, a battery 24, a microphone 25, a speaker 26, etc.

The touch display screen 21 may be a retractable touch display screen. The retractable touch display screen may be a touch display screen capable of extending and retracting. The retractable touch display screen may be a flexible display, which can be bent, rolled, folded, etc. On the electronic device arranged with a retractable touch display, the visible size of the screen may be increased by extending the screen, and the visible size of the screen may be reduced by retracting the screen.

The memory 22 may be configured to store an application program and data. The application program stored in the memory 22 contains executable code. The application program may be composed of various functional modules. The processor 23 executes various functional applications and data processing by executing the application program stored in the memory 22.

The processor 23 is a control center of the electronic device and connects various parts of the entire electronic device using various interfaces and lines to perform various functions of the electronic device and process data by running or executing applications stored in the memory 22 and calling data stored in the memory 22, thereby monitoring the electronic device as a whole.

The battery 24 may be configured to power various modules and components of the electronic device.

The microphone 25 may be configured to pick up sound signals in the surrounding environment, for example, to receive voice commands issued by the user.

The speaker 26 may be configured to play sound signals.

In the embodiments, the processor 23 in the electronic device loads the executable code corresponding to the processes of one or more application programs into the memory 22 in accordance with the following instructions, and the processor 23 runs the application programs stored in the memory 22 so as to execute the following.

obtaining a changing distance of the retractable display screen in an extending-retracting direction in response to the retractable display screen being extended or retracted.

adjusting a spacing of application icons in the extending-retracting direction displayed on a current desktop and/or a number of the application icons in the extending-retracting direction according to the changing distance.

In some embodiments, when the processor 23 executes the adjusting a spacing of application icons in the extending-retracting direction displayed on a current desktop and/or a number of the application icons in the extending-retracting direction according to the changing distance, the processor 23 may execute: increasing the spacing of the application icons on the current desktop in the extending-retracting direction in response to the changing distance being an extending distance.

In some embodiments, when the processor 23 executes the increasing the spacing of the application icons on the current desktop in the extending-retracting direction, the processor 23 may execute: increasing the spacing of the application icons in the extending-retracting direction until the retractable display screen is stopped extending.

In some embodiments, when the processor 23 executes the increasing the spacing of the application icons in the extending-retracting direction until the retractable display screen is stopped extending, the processor 23 may execute: synchronously increasing the spacing of the application icons in the extending-retracting direction as the extending distance increases, until the retractable display screen is stopped extending.

In some embodiments, when the processor 23 executes the increasing the spacing of the application icons on the current desktop in the extending-retracting direction, the processor 23 may execute: continuing to increase the spacing of the application icons in the extending-retracting direction in response to the spacing of the application icons in the extending-retracting direction being less than a first spacing, where the first spacing is greater than the spacing of the application icons in the extending-retracting direction when the retractable display screen is in an unextended state.

In some embodiments, when the processor 23 executes the increasing the spacing of the application icons on the current desktop in the extending-retracting direction, the processor 23 may execute: stopping increasing the spacing of the application icons in the extending-retracting direction in response to the spacing of the application icons in the extending-retracting direction being equal to the first spacing.

In some embodiments, after the stopping increasing the spacing of the application icons in the extending-retracting direction in response to the spacing of the application icons in the extending-retracting direction being equal to the first spacing, the processor 23 may execute: after an initial moment at which the spacing of the application icons in the extending-retracting direction is equal to the first spacing, increasing the number of the application icons displayed on the current desktop in response to a newly added extending distance being greater than a first distance. The first distance may be a sum of a length of the application icons in the extending-retracting direction and the first spacing. The first distance may be the first spacing.

In some embodiments, the spacing of the application icons in the extending direction is set with a first initial spacing, and the first initial spacing is the spacing of the application icons in the extending-retracting direction when the retractable display screen is in the unextended state; when the processor 23 executes the adjusting a number of the application icons in the extending-retracting direction according to the changing distance, the processor 23 may execute: maintaining the spacing of the application icons in the extending-retracting direction as the first initial spacing and increasing the number of the application icons on the current desktop, in response to the changing distance being the extending distance.

In some embodiments, when the processor 23 executes the increasing the number of the application icons on the current desktop, the processor 23 may execute: increasing the number of the application icons displayed on the current desktop, in response to the extending distance being greater than a second distance. The second distance may be a sum of the length of each application icon in the extending-retracting direction and the first initial spacing. The second distance may be the first initial spacing.

In some embodiments, when the processor 23 executes the adjusting a spacing of application icons in the extending-retracting direction displayed on a current desktop according to the changing distance, the processor 23 may execute: reducing the spacing of the application icons on the current desktop in the extending-retracting direction, in response to the changing distance being a retracting distance.

In some embodiments, when the processor 23 executes the reducing the spacing of the application icons on the current desktop in the extending-retracting direction, the processor 23 may execute: reducing the spacing of the application icons in the extending-retracting direction until the extendable display screen is stopped retracting.

In some embodiments, when the processor 23 executes the reducing the spacing of the application icons in the extending-retracting direction until the extendable display screen is stopped retracting, the processor 23 may execute: as the retracting distance decreases, synchronously reducing the spacing of the application icons in the extending-retracting direction until the retractable display screen is stopped retracting.

In some embodiments, when the processor 23 executes the reducing the spacing of the application icons on the current desktop in the extending-retracting direction, the processor 23 may execute: obtaining a first extending length of the retractable display screen at an initial moment when the spacing of the application icons in the extending-retracting direction increases to be equal to a second spacing, in response to the changing distance being a retracting distance; maintaining the spacing of the application icons in the extending-retracting direction unchanged, in response to an extending length of the retractable display screen being greater than or equal to the first extending length; and reducing the spacing of the application icons in the extending-retracting direction, in response to the extending length of the retractable display screen being less than the first extending length.

In some embodiments, after the maintaining the spacing of the application icons in the extending-retracting direction unchanged, in response to an extending length of the retractable display screen being greater than or equal to the first extending length, the processor 23 may execute: reducing the number of the application icons displayed on the current desktop in response to the retracting distance being greater than a third distance. The third distance may be a sum of the length of the application icon in the extending-retracting direction and the second spacing of the application icons in the extending-retracting direction. The third distance may be the second spacing of the application icons in the extending direction.

In some embodiments, when the processor 23 executes the adjusting a number of the application icons in the extending-retracting direction according to the changing distance, the processor 23 may execute: maintaining the spacing of the application icons in the extending-retracting direction at a second initial spacing and reducing the number of the application icons on the current desktop, in response to the changing distance being a retracting distance; where the second initial spacing is a spacing of the application icons in the extending-retracting direction before a current extension or retraction.

In some embodiments, when the processor 23 executes the reducing the number of the application icons on the current desktop, the processor 23 may execute: reducing the number of the application icons on the current desktop in response to the retracting distance being greater than a fourth distance. The fourth distance may be a sum of the length of the application icon in the extending-retracting direction and the second initial spacing. The fourth distance may be the second initial spacing.

As can be seen from the above, in the present disclosure, the processor is configured to obtain a changing distance of the retractable display screen in an extending-retracting direction in response to the retractable display screen being extended or retracted; and adjust a spacing of application icons in the extending-retracting direction displayed on a current desktop and/or a number of the application icons according to the changing distance. In this solution, according to the changing distance of the retractable display screen of the electronic device in the extending-retracting direction, the spacing of the application icons in the extending-retracting direction of the application icons displayed on the current desktop and/or the number of the application icons are correspondingly adjusted, such that the layout of application icons on the display region changes accordingly with the changing distance during the extending or retracting of the retractable display screen, thereby enhancing the flexibility of the arrangement of application icons on the display region during the extending or retracting of the retractable display screen.

In the above-mentioned embodiments, the description of each embodiment has its own emphasis. For parts that are not described in detail in a certain embodiment, reference may be made to the detailed description of the device control method above, and details are not repeated here.

The device control apparatus provided in the embodiments of the present disclosure and the device control method in the above embodiments belong to the same concept, and any method provided in the device control method embodiments can be executed on the device control apparatus. For details of the implementation process, reference may be made to the embodiments of the device control method, which will not be repeated herein.

It should be noted that, for the device control method described in the embodiments of the present disclosure, it is understood by those skilled in the art that all or part of the process for implementing the device control method described in the embodiments of the present disclosure can be accomplished by controlling the relevant hardware by means of a computer program, the computer program may be stored in a computer-readable storage medium, such as in a memory, and executed by at least one processor. The execution may include processes as in the embodiments of the device control method. The storage medium may be a disk, an optical disk, a read only memory (ROM), a random-access memory (RAM), etc.

For the device control device described in the embodiments of the present disclosure, each of its functional modules can be integrated in a processing chip, or each module can be physically present separately, or two or more modules can be integrated in a single module. The integrated modules can be implemented either in the form of hardware or in the form of software functional modules. The integrated modules, when implemented as software function modules and sold or used as stand-alone products, can also be stored in a computer-readable storage medium, such as a read-only memory, disk or CD-ROM, etc.

The above embodiments of the present disclosure provide a device control method, an apparatus, a storage medium, and an electronic device, and the application of specific examples in this specification to illustrate the principles and implementation of the present disclosure. The description of the above embodiments is only intended to help understand the method and core ideas of the present disclosure. For those skilled in the art, according to the ideas of the present disclosure, there will be changes in the specific implementation and the scope of application, in summary, the contents of this specification should not be understood as a limitation of the present disclosure.

What is claimed is:

1. A device control method, performed by an electronic device; wherein the electronic device comprises a retractable display screen, and the device control method comprises:
    obtaining a changing distance of the retractable display screen in an extending-retracting direction in response to the retractable display screen being extended or retracted;
    adjusting a spacing of application icons displayed on a current desktop in the extending-retracting direction according to the changing distance, comprising:
        increasing the spacing of the application icons displayed on the current desktop in the extending-retracting direction in response to the changing distance being an extending distance; and
    adjusting a number of the application icons displayed on the current desktop in the extending-retracting direction according to the changing distance, after increasing the spacing of the application icons displayed on the current desktop in the extending-retracting direction in response to the changing distance being the extending distance;
    wherein increasing the spacing of the application icons displayed on the current desktop in the extending-retracting direction in response to the changing distance being the extending distance comprises:

continuing to increase the spacing of the application icons in the extending-retracting direction in response to the spacing of the application icons in the extending-retracting direction being less than a first spacing; wherein the first spacing is greater than the spacing of the application icons in the extending-retracting direction when the retractable display screen is in an unextended state; and stopping increasing the spacing of the application icons in the extending-retracting direction in response to the spacing of the application icons in the extending-retracting direction being equal to the first spacing;

wherein adjusting the number of the application icons displayed on the current desktop in the extending-retracting direction according to the changing distance comprises:

after an initial moment at which the spacing of the application icons in the extending-retracting direction is equal to the first spacing, increasing the number of the application icons displayed on the current desktop in response to a newly added extending distance being greater than a first distance.

2. The device control method according to claim 1, wherein increasing the spacing of the application icons displayed on the current desktop in the extending-retracting direction comprises:

increasing the spacing of the application icons in the extending-retracting direction until the retractable display screen has stopped extending.

3. The device control method according to claim 2, wherein increasing the spacing of the application icons in the extending-retracting direction until the retractable display screen has stopped extending comprises:

synchronously increasing the spacing of the application icons in the extending-retracting direction as the extending distance increases, until the retractable display screen has stopped extending.

4. The device control method according to claim 1, wherein the first distance is a sum of a length of each application icon in the extending-retracting direction and the first spacing.

5. The device control method according to claim 1, wherein the first distance is equal to the first spacing.

6. The device control method according to claim 1, wherein adjusting the spacing of the application icons displayed on the current desktop in the extending-retracting direction according to the changing distance comprises:

reducing the spacing of the application icons displayed on the current desktop in the extending-retracting direction, in response to the changing distance being a retracting distance.

7. The device control method according to claim 6, wherein reducing the spacing of the application icons displayed on the current desktop in the extending-retracting direction comprises:

reducing the spacing of the application icons in the extending-retracting direction until the retractable display screen has stopped retracting.

8. The device control method according to claim 6, wherein reducing the spacing of the application icons displayed on the current desktop in the extending-retracting direction comprises:

obtaining a first extending length of the retractable display screen at an initial moment when the spacing of the application icons in the extending-retracting direction increases to be equal to a second spacing;

maintaining the spacing of the application icons in the extending-retracting direction unchanged, in response to an extending length of the retractable display screen being greater than or equal to the first extending length; and reducing the spacing of the application icons in the extending-retracting direction, in response to the extending length of the retractable display screen being less than the first extending length.

9. The device control method according to claim 8, after maintaining the spacing of the application icons in the extending-retracting direction unchanged, in response to the extending length of the retractable display screen being greater than or equal to the first extending length, further comprising:

reducing the number of the application icons displayed on the current desktop in response to the retracting distance being greater than a third distance.

10. The device control method according to claim 9, wherein the third distance is a sum of a length of each application icon in the extending-retracting direction and the second spacing.

11. The device control method according to claim 9, wherein the third distance is equal to the second spacing.

12. The device control method according to claim 1, further comprising:

adjusting a number of the application icons displayed on the current desktop in the extending-retracting direction according to the changing distance, comprising:

maintaining the spacing of the application icons in the extending-retracting direction at a second initial spacing and reducing the number of the application icons displayed on the current desktop, in response to the changing distance being a retracting distance; wherein the second initial spacing is a spacing of the application icons in the extending-retracting direction before a current extension or retraction.

13. A non-transitory computer-readable storage medium for an electronic device, storing a computer program; wherein the electronic device comprises a retractable display screen; wherein the computer program is executable by a computer to cause the computer to perform:

obtaining a changing distance of the retractable display screen in an extending-retracting direction in response to the retractable display screen being extended or retracted;

adjusting a spacing of application icons displayed on a current desktop in the extending-retracting direction according to the changing distance, comprising:

increasing the spacing of the application icons displayed on the current desktop in the extending-retracting direction in response to the changing distance being an extending distance; and adjusting a number of the application icons displayed on the current desktop in the extending-retracting direction according to the changing distance, after increasing the spacing of the application icons displayed on the current desktop in the extending-retracting direction in response to the changing distance being the extending distance;

wherein increasing the spacing of the application icons displayed on the current desktop in the extending-retracting direction in response to the changing distance being the extending distance comprises:

continuing to increase the spacing of the application icons in the extending-retracting direction in response to the spacing of the application icons in the extending-retracting direction being less than a first spacing; wherein the first spacing is greater than the spacing of the application icons in the extending-retracting direction when the retractable display screen is in an unextended state; and stopping increasing the spacing of the application icons in the extending-retracting direction in response to the spacing of the application icons in the extending-retracting direction being equal to the first spacing;

wherein adjusting the number of the application icons displayed on the current desktop in the extending-retracting direction according to the changing distance comprises:

after an initial moment at which the spacing of the application icons in the extending-retracting direction is equal to the first spacing, increasing the number of the application icons displayed on the current desktop in response to a newly added extending distance being greater than a first distance.

14. An electronic device, comprising a retractable display screen, a processor, and a memory; wherein the memory stores a computer program, and the processor is configured to perform by calling the computer program:

obtaining a changing distance of the retractable display screen in an extending-retracting direction in response to the retractable display screen being extended or retracted;

adjusting a spacing of application icons displayed on a current desktop in the extending-retracting direction according to the changing distance, comprising:

increasing the spacing of the application icons displayed on the current desktop in the extending-retracting direction in response to the changing distance being an extending distance; and adjusting a number of the application icons displayed on the current desktop in the extending-retracting direction according to the changing distance, after increasing the spacing of the application icons displayed on the current desktop in the extending-retracting direction in response to the changing distance being the extending distance;

wherein increasing the spacing of the application icons displayed on the current desktop in the extending-retracting direction in response to the changing distance being the extending distance comprises:

continuing to increase the spacing of the application icons in the extending-retracting direction in response to the spacing of the application icons in the extending-retracting direction being less than a first spacing; wherein the first spacing is greater than the spacing of the application icons in the extending-retracting direction when the retractable display screen is in an unextended state; and stopping increasing the spacing of the application icons in the extending-retracting direction in response to the spacing of the application icons in the extending-retracting direction being equal to the first spacing;

wherein adjusting the number of the application icons displayed on the current desktop in the extending-retracting direction according to the changing distance comprises:

after an initial moment at which the spacing of the application icons in the extending-retracting direction is equal to the first spacing, increasing the number of the application icons displayed on the current desktop in response to a newly added extending distance being greater than a first distance.

* * * * *